(12) United States Patent
Takahashi

(10) Patent No.: US 12,742,750 B2
(45) Date of Patent: Sep. 22, 2026

(54) DETECTION DEVICE, DETECTION SYSTEM, PROPAGATION MEMBER, FIXTURE, AND STORAGE MEDIUM

(71) Applicant: Kabushiki Kaisha Toshiba, Kawasaki (JP)

(72) Inventor: Hiromasa Takahashi, Minato (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 421 days.

(21) Appl. No.: 18/358,334

(22) Filed: Jul. 25, 2023

(65) Prior Publication Data

US 2023/0366856 A1 Nov. 16, 2023

Related U.S. Application Data

(63) Continuation of application No. PCT/JP2022/003559, filed on Jan. 31, 2022.

(30) Foreign Application Priority Data

Feb. 1, 2021 (JP) ................................. 2021-014600

(51) Int. Cl.
*G01N 29/24* (2006.01)
*G01N 29/28* (2006.01)

(52) U.S. Cl.
CPC ............. *G01N 29/24* (2013.01); *G01N 29/28* (2013.01)

(58) Field of Classification Search
CPC ...... G01N 29/24; G01N 29/28; G01N 29/043; G01N 29/11; G01N 29/225; G01N 29/265
See application file for complete search history.

(56) References Cited

U.S. PATENT DOCUMENTS

2002/0068871 A1 6/2002 Mendlein et al.
2011/0000299 A1 1/2011 Isobe et al.
2011/0040185 A1 2/2011 Matsumura
2020/0003735 A1* 1/2020 Ushijima ............. G01N 29/225
(Continued)

FOREIGN PATENT DOCUMENTS

CN 1982889 A 6/2007
CN 103278566 A 9/2013
CN 107157512 A 9/2017
(Continued)

OTHER PUBLICATIONS

International Search Report issued Mar. 15, 2022 in PCT/JP2022/003559 filed on Jan. 31, 2022, 3 pages.
(Continued)

*Primary Examiner* — Tarun Sinha
(74) *Attorney, Agent, or Firm* — Oblon, McClelland, Maier & Neustadt, L.L.P.

(57) ABSTRACT

According to one embodiment, a detection device includes a detector, a first propagation member, a second propagation member, and a fixture. The detector includes a plurality of detection elements configured to transmit and detect an ultrasonic wave. The first propagation member is attached to the detector and is configured to propagate the ultrasonic wave. The second propagation member is configured to propagate the ultrasonic wave and is softer than the first propagation member. The fixture is configured to detachably fix the second propagation member to the first propagation member.

19 Claims, 20 Drawing Sheets

(56) References Cited

U.S. PATENT DOCUMENTS

| | | | |
|---|---|---|---|
| 2023/0104515 A1 | 4/2023 | Takahashi et al. | |

FOREIGN PATENT DOCUMENTS

| | | | | |
|---|---|---|---|---|
| CN | 107650127 | A | | 2/2018 |
| JP | 2-132368 | A | | 5/1990 |
| JP | 2007-278809 | A | | 10/2007 |
| JP | 2008-259541 | A | | 10/2008 |
| JP | 2009-36623 | A | | 2/2009 |
| JP | 2009-204327 | A | | 9/2009 |
| JP | 2013-154217 | A | | 8/2013 |
| JP | 2018110712 | A | * | 7/2018 |
| JP | 2019-90727 | A | | 6/2019 |
| JP | 2021-193342 | A | | 12/2021 |

OTHER PUBLICATIONS

Combined Chinese Office Action and Search Report issued Dec. 30, 2025, in corresponding Chinese Patent Application No. 202280012737.8 (with English Translation), 28 pages.

* cited by examiner

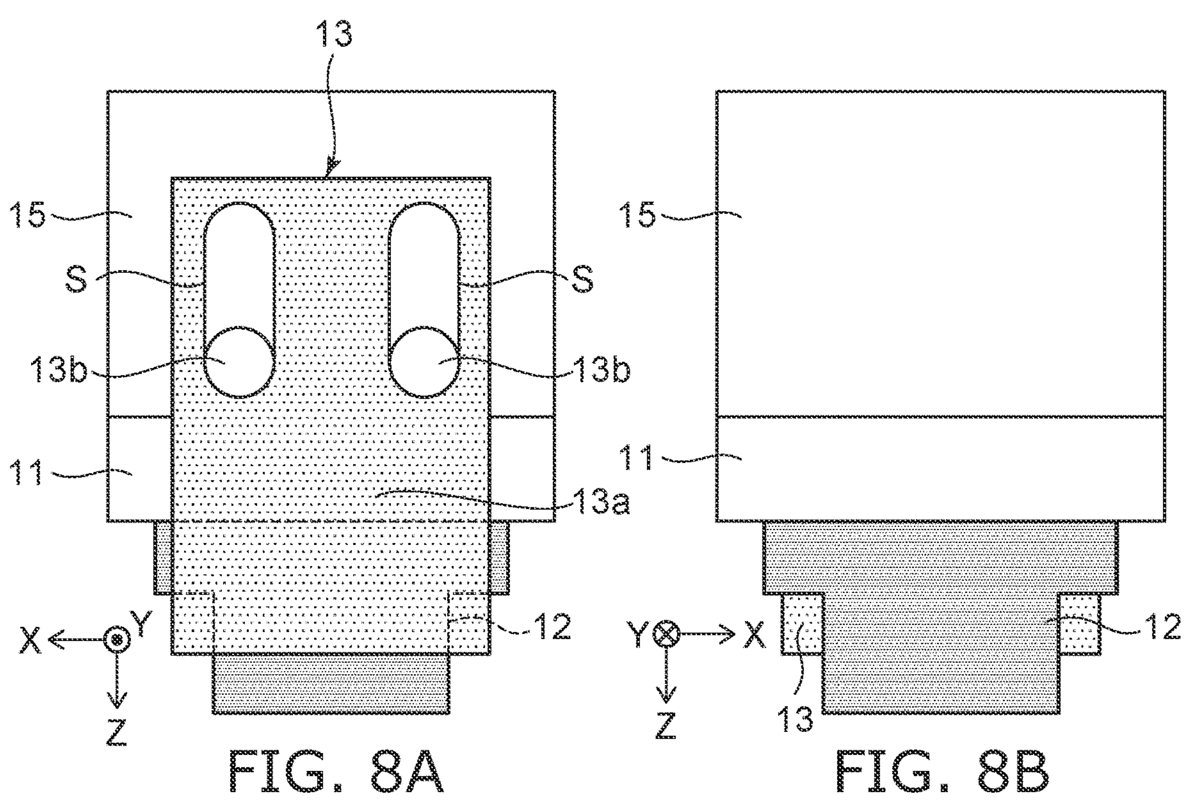
FIG. 8A
FIG. 8B
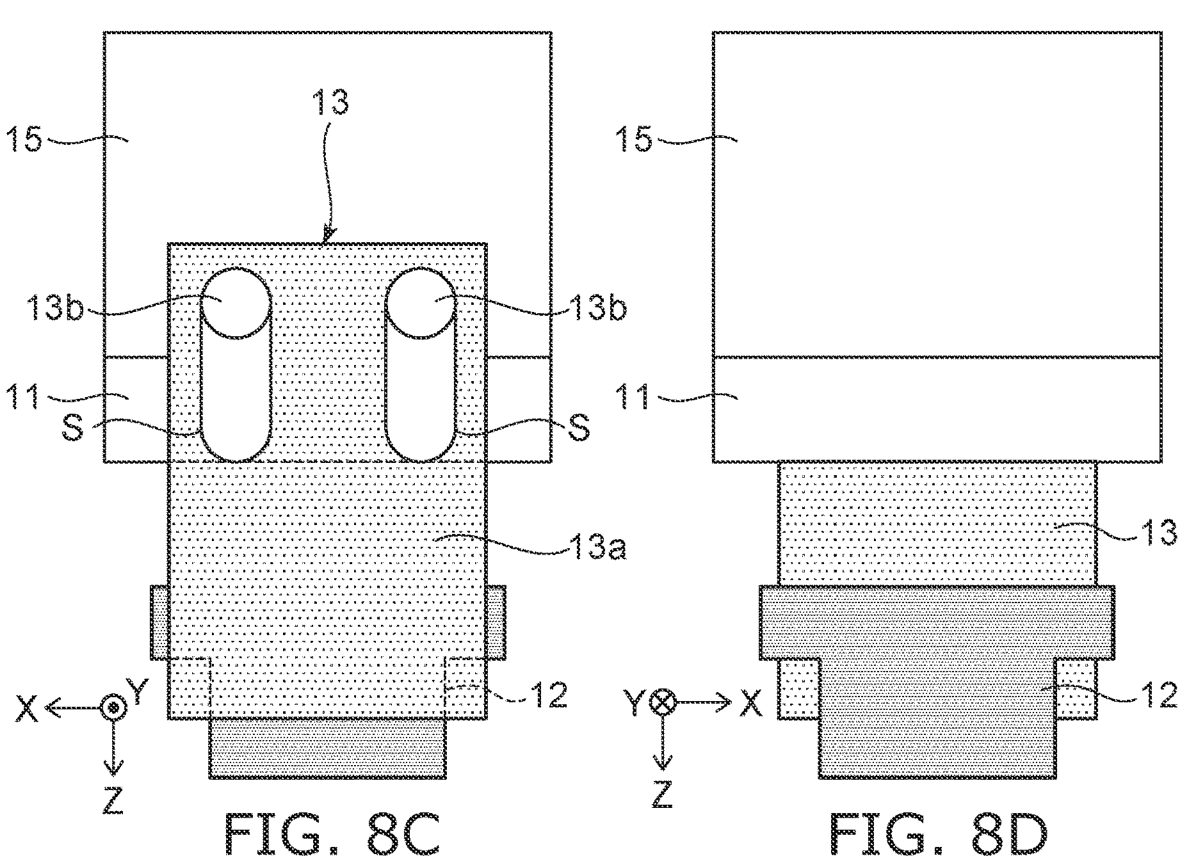
FIG. 8C
FIG. 8D

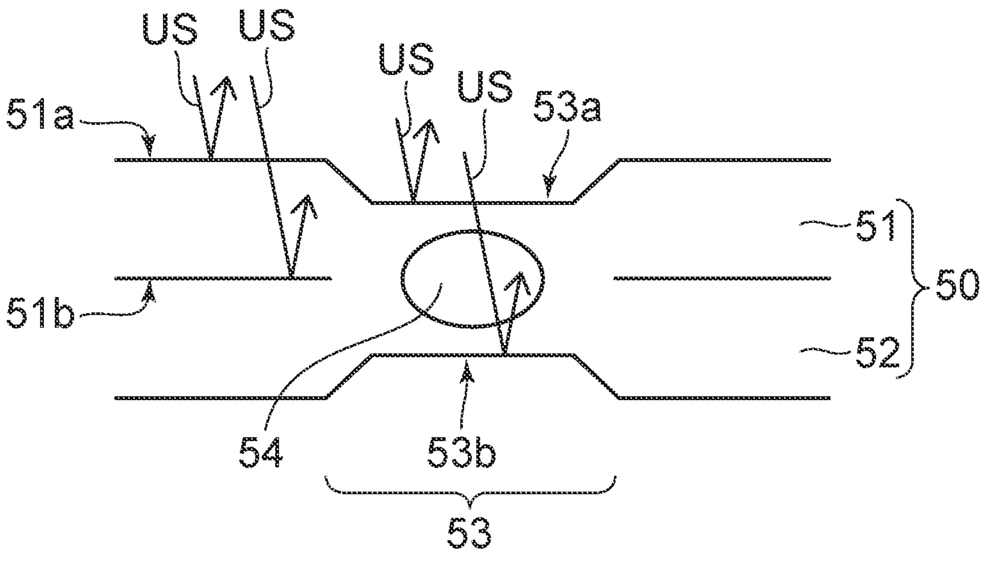
FIG. 14A
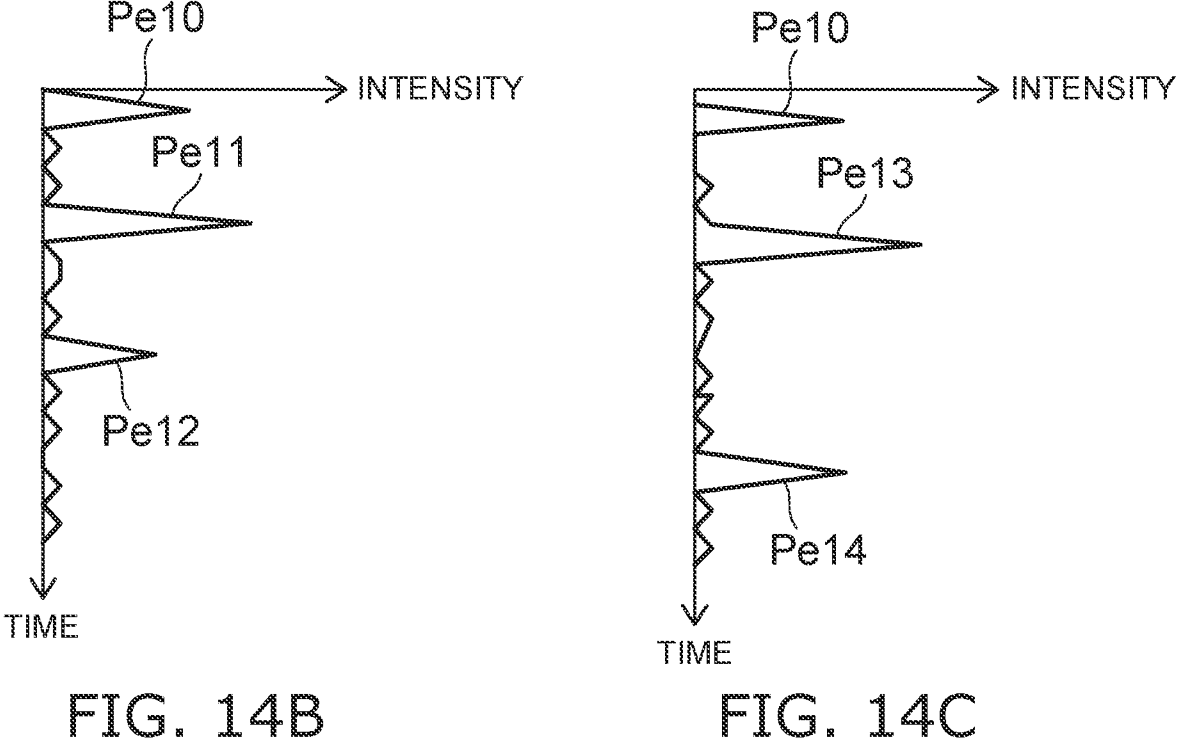
FIG. 14B
FIG. 14C

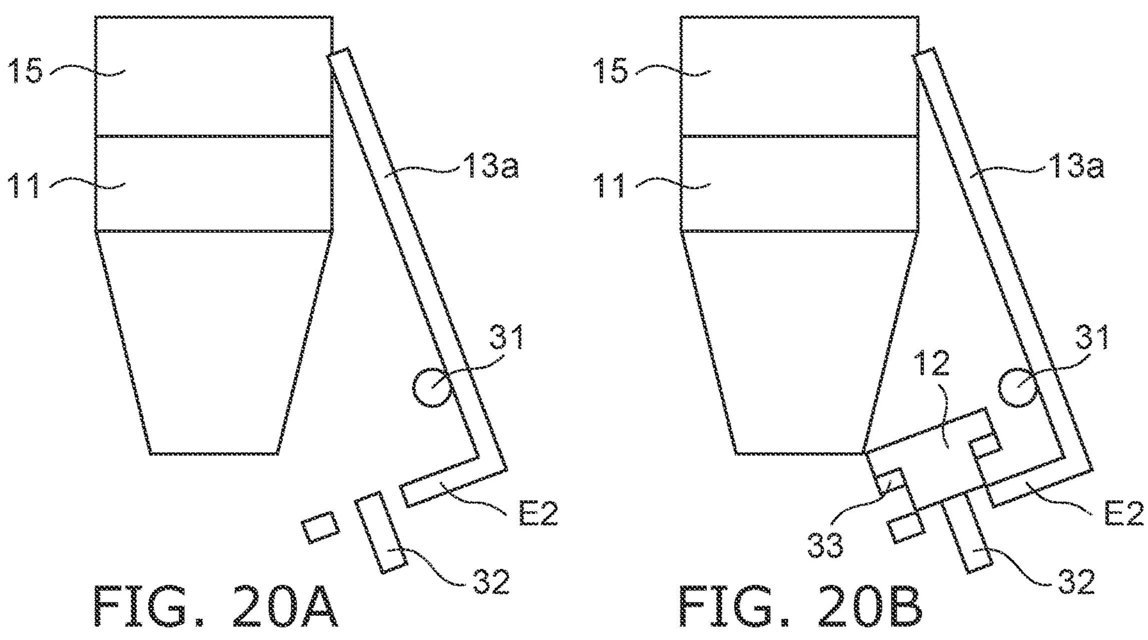
FIG. 20A
FIG. 20B
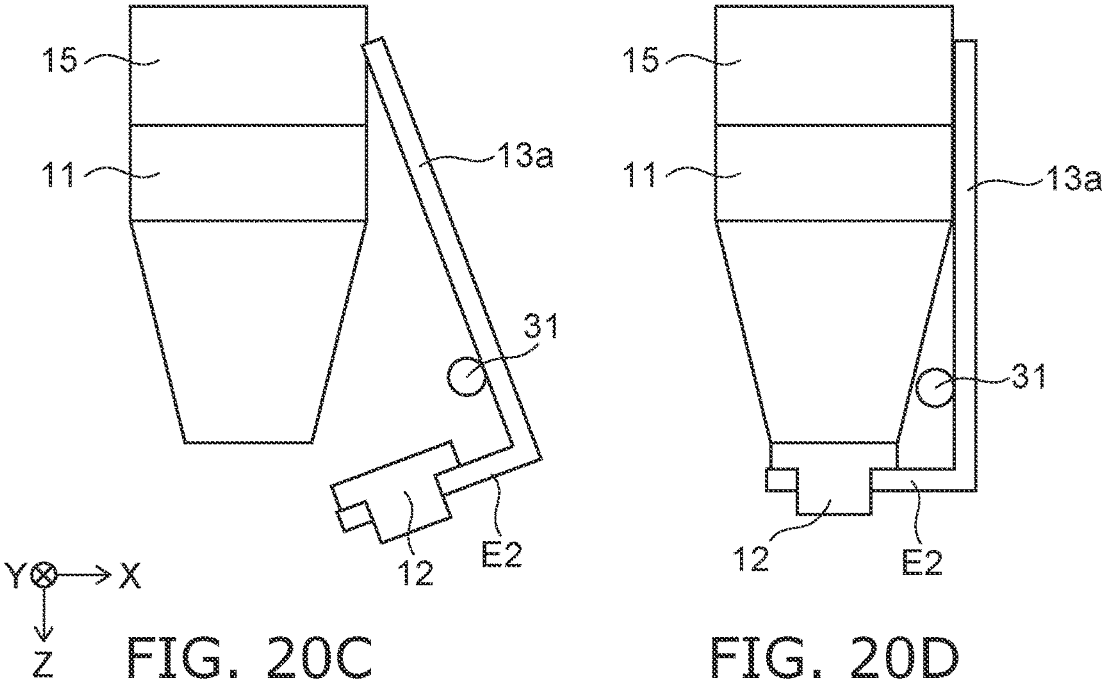
FIG. 20C
FIG. 20D

DETECTION DEVICE, DETECTION SYSTEM, PROPAGATION MEMBER, FIXTURE, AND STORAGE MEDIUM

CROSS-REFERENCE TO RELATED APPLICATIONS

This is a continuation application of International Patent Application No. PCT/JP2022/003559, filed on Jan. 31, 2022; and also claims priority to Japanese Patent Application No. 2021-014600, filed on Feb. 1, 2021; the entire contents of which are incorporated herein by reference.

FIELD

Embodiments described herein relate to a detection device, a detection system, a propagation member, a fixture, and a storage medium.

BACKGROUND

There has been a detection device that transmits ultrasonic waves to an object and detects reflected waves. Development of a detection device that does not require a couplant liquid is desired.

BRIEF DESCRIPTION OF THE DRAWINGS

FIG. 8A to FIG. 8D are side views schematically showing another fixture;

FIG. 14A to FIG. 14C are schematic diagrams illustrating an inspection method using the detection device according to the embodiment;

FIGS. 20A to 20D are schematic diagrams showing an operation of each unit that replaces the second propagation member.

DETAILED DESCRIPTION

Figure 1:
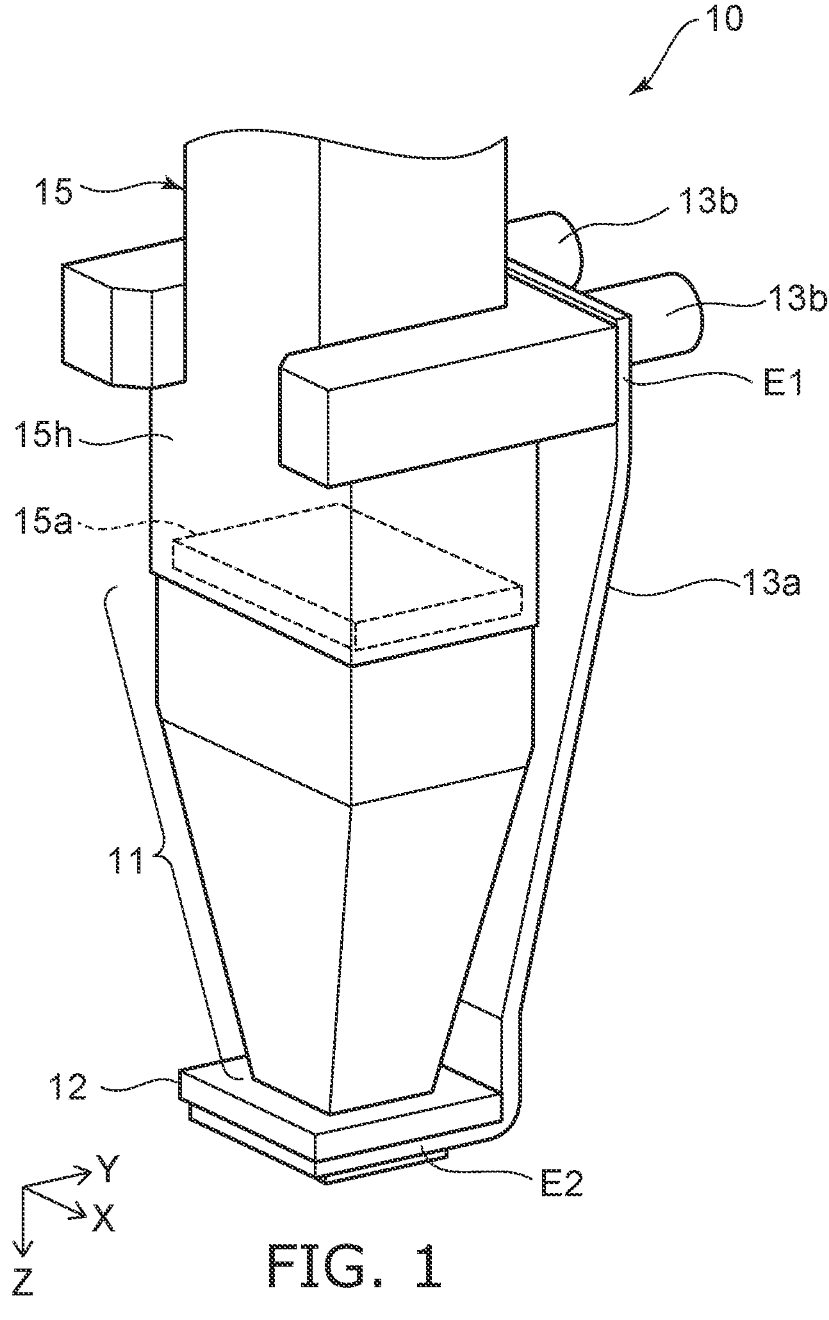
FIG. 1 is a perspective view showing a detection device according to an embodiment.

According to one embodiment, a detection device includes a detector, a first propagation member, a second propagation member, and a fixture. The detector includes a plurality of detection elements configured to transmit and detect an ultrasonic wave. The first propagation member is attached to the detector and is configured to propagate the ultrasonic wave. The second propagation member is configured to propagate the ultrasonic wave and is softer than the first propagation member. The fixture is configured to detachably fix the second propagation member to the first propagation member.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIG. 1 is a perspective view showing a detection device according to an embodiment.

As shown in FIG. 1, a detection device 10 according to the embodiment includes a first propagation member 11, a second propagation member 12, a fixture 13, and a detector 15.

The detector 15 includes an element array **15*a*. The element array 15*a* includes multiple detection elements. Each detection element transmits ultrasonic waves. Each detection element detects reflected waves of the ultrasonic waves. Here, transmission of the ultrasonic waves and detection of the reflected waves by the detector 15 is called probing. A side of the element array 15*a* is surrounded by a housing 15*h* of the detector 15**. The side is a direction intersecting a transmission direction of the ultrasonic wave.

The first propagation member 11 is attached to the detector 15 (the housing **15*h*). The first propagation member 11 is capable of propagating ultrasonic waves. For example, the first propagation member 11 is in contact with the detector 15. Alternatively, another member capable of propagating ultrasonic waves may be provided between the first propagation member 11 and the detector 15**.

The second propagation member 12 is attached to the first propagation member 11 by the fixture 13. The first propagation member 11 is positioned between the detector 15 and the second propagation member 12. The second propagation member 12 is capable of propagating ultrasonic waves. The ultrasonic waves propagated through the first propagation member 11 propagate through the second propagation member 12 and are emitted to an outside of the detection device 10.

The first propagation member 11 is solid. The first propagation member 11 has a sufficient hardness such that the first propagation member 11 substantially does not change when the detection device 10 operates. Accordingly, damage to the element array 15*a* can be prevented. The second propagation member 12 is gel-like and not liquid. The second propagation member 12 is softer than the first propagation member 11. That is, a hardness of the second propagation member 12 is lower than the hardness of the first propagation member 11. Therefore, the second propagation member 12 is deformed more easily than the first propagation member 11. The first propagation member 11 has sufficient flexibility such that the first propagation member 11 is deformable according to a surface shape of an object to be inspected when the detection device 10 operates.

The fixture 13 fixes the second propagation member 12 while the second propagation member 12 is in contact with the first propagation member 11. The fixture 13 detachably fixes the second propagation member 12 to the first propagation member 11.

In the example of FIG. 1, the fixture 13 includes a plate member 13*a* and fasteners 13*b*. The plate member 13*a* includes a first end portion E1 and a second end portion E2. The first end portion E1 is fastened and fixed to the housing 15*h* by the fasteners 13*b*. The fasteners 13*b* are, for example, screws. The plate member 13*a* extends along a direction toward the second propagation member 12 from the housing 15*h*. The second end portion E2 opposite to the first end portion E1 is bent such that the second propagation member 12 is positioned between the first propagation member 11 and the second end portion E2. A portion of the second propagation member 12 is sandwiched between the second end portion E2 and the first propagation member 11.

The plate member 13*a* may be an elastic plate spring. An elastic force is generated in the plate member 13*a* in a direction in which the second propagation member 12 is pressed toward the first propagation member 11. The second propagation member 12 may be pressed by a linear member such as a hard steel wire instead of the plate member 13*a*. A specific structure of the fixture 13 can be changed as appropriate as long as the fixture 13 includes a pressing member whose one end can be fixed to the housing 15*h* and the other end can press the second propagation member 12 toward the first propagation member 11.

For example, the first propagation member 11 and the second propagation member 12 contain resin. As a specific example, the first propagation member 11 contains acrylic. The second propagation member 12 contains segmented polyurethane.

For example, the detection device 10 transmits ultrasonic waves to a bonded body and detects reflected waves. A typical steel plate used for bonding has an acoustic impedance of about $4.5\times10^7$ (Pa·s/m). It is favorable that the first propagation member 11 and the second propagation member 12 each have an acoustic impedance larger than $1.0\times10^5$ (Pa·s/m) and smaller than $1.0\times10^8$ (Pa·s/m), so that the ultrasonic waves sufficiently propagate between the detection device 10 and the bonded body. The acoustic impedance can be measured according to JIS A1405-1 (ISO 10534-1). The acoustic impedance may be measured according to JIS A1409 (ISO 354).

In order to prevent the deformation of the first propagation member 11, it is favorable that the first propagation member 11 has a Rockwell hardness (M scale) that is larger than 80 and less than 110. The Rockwell hardness can be measured according to JISZ2245 (ISO2039-2). It is favorable that the second propagation member 12 has a hardness measured by an ASKER Durometer type F that is larger than 40 and less than 60, so that the second propagation member 12 is easily deformed according to the surface shape of the object.

Here, a direction from the first propagation member 11 toward the second propagation member 12 is referred to as a Z-direction (a first direction). One direction intersecting the Z-direction is taken as an X-direction (a second direction). One direction intersecting a Z-X plane is taken as a Y-direction (a third direction). For example, the X-direction, the Y-direction, and the Z-direction are orthogonal to one another.

Figure 2A:
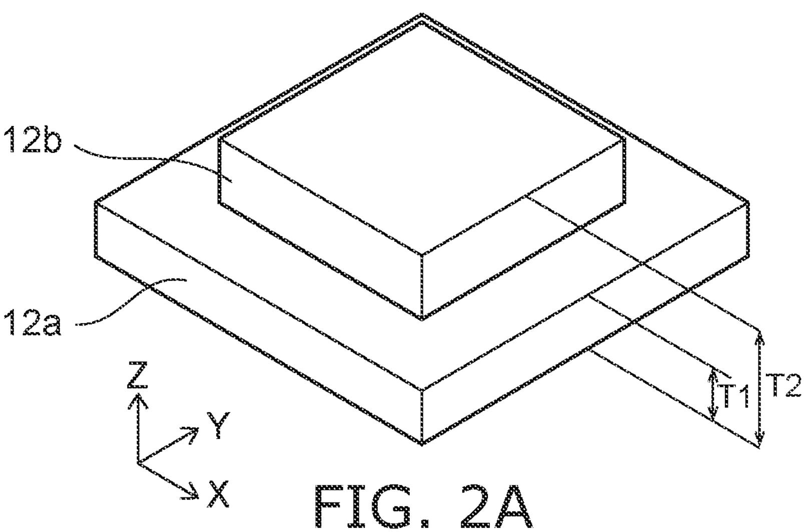
FIG. 2A and FIG. 2B are a perspective view and a bottom view showing a second propagation member, respectively.
Figure 2B:
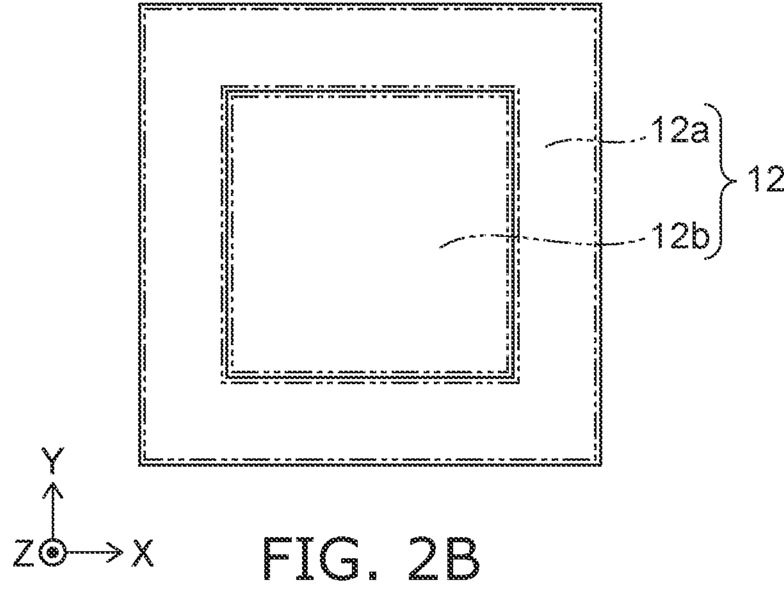

FIG. 2A and FIG. 2B are a perspective view and a bottom view showing the second propagation member, respectively.

As shown in FIG. 2A and FIG. 2B, the second propagation member 12 includes a first portion 12*a* and a second portion 12*b*.

The first portion 12*a* is positioned on an outer periphery of the second propagation member 12 and pressed by the fixture 13. The second portion 12*b* is surrounded by the first portion 12*a*. The first portion 12*a* is positioned around the second portion 12*b* along an X-Y plane. For example, the second portion 12*b* is positioned at a center of the second propagation member 12.

The second portion 12*b* protrudes from the first portion 12*a* in the Z-direction. For example, as shown in FIG. 2A, a thickness T2 of the second portion 12*b* is larger than a thickness T1 of the first portion 12*a*. The thickness corresponds to a length in the Z-direction.

Figure 3A:
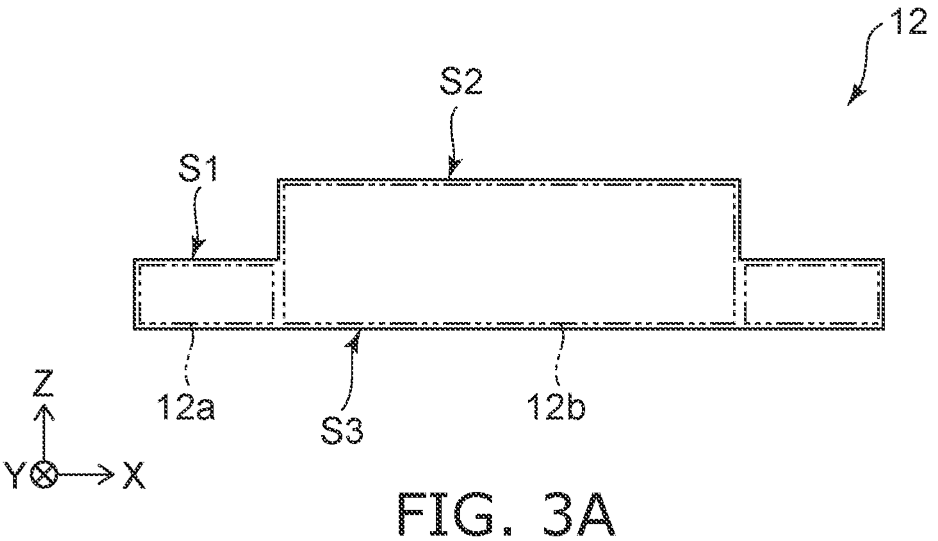
FIG. 3A and FIG. 3B are side views showing the second propagation member.
Figure 3B:
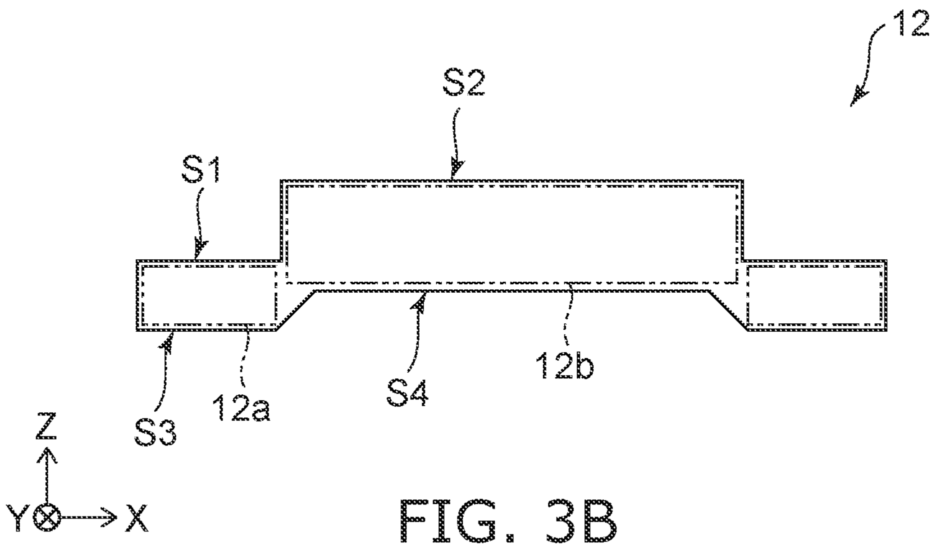

FIG. 3A and FIG. 3B are side views showing the second propagation member.

An example of a specific structure of the second propagation member 12 will be described. As shown in FIG. 3A, the first portion 12*a* and the second portion 12*b* have a first plane S1 and a second plane S2 that intersect the Z-direction, respectively. The first portion 12*a* and the second portion 12*b* have a common third plane S3 intersecting the Z-direction. The third plane S3 is positioned on an opposite side of the first plane S1 and the second plane S2. For example, the first plane S1, the second plane S2, and the third plane S3 are parallel to one another. A position of the first plane S1 in the Z-direction is between a position of the second plane S2 in the Z-direction and a position of the third plane S3 in the Z-direction.

As another example, as shown in FIG. 3B, the first portion 12*a* and the second portion 12*b* may have the third plane S3 and a fourth plane S4 that intersect the Z-direction, respectively. The third plane S3 is positioned on the opposite side of the first plane S1. The fourth plane S4 is positioned on the opposite side of the second plane S2. For example, the first plane S1, the second plane S2, the third plane S3, and the fourth plane S4 are parallel to one another. The position of the first plane S1 in the Z-direction and a position of the fourth plane S4 in the Z-direction are between the position of the second plane S2 in the Z-direction and the position of the third plane S3 in the Z-direction.

Figure 4A:
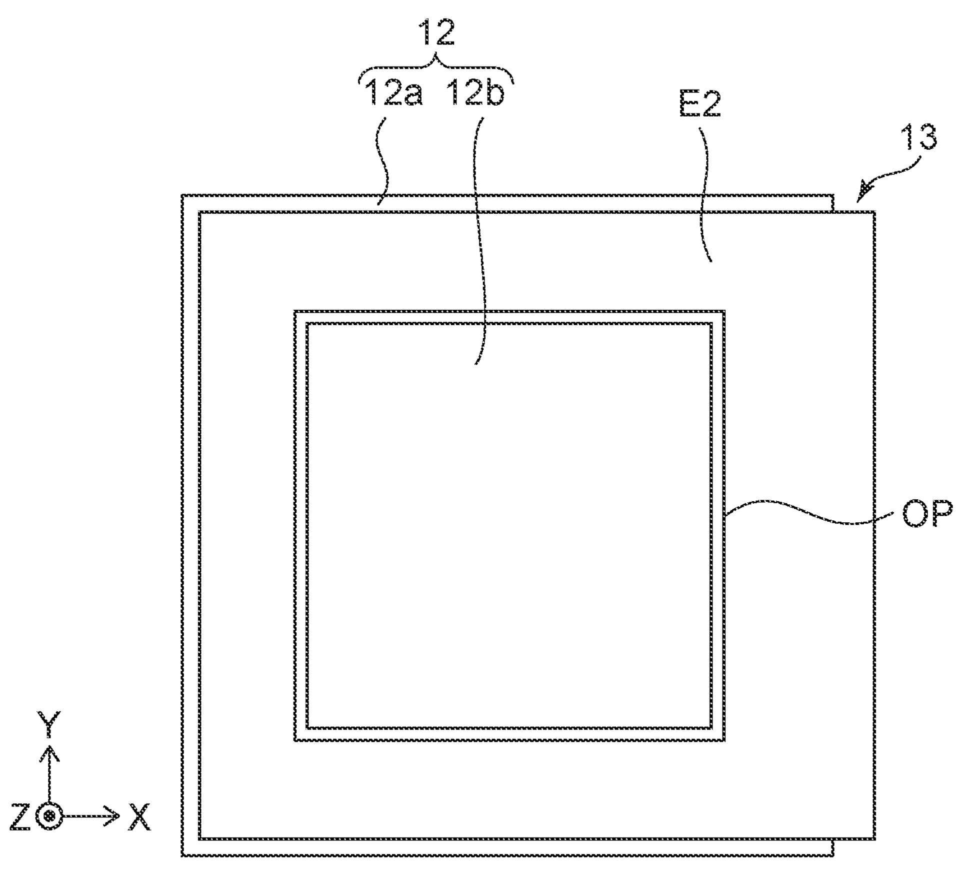
FIG. 4A and FIG. 4B are a bottom view and a side view showing a portion of the detection device according to the embodiment, respectively.
Figure 4B:
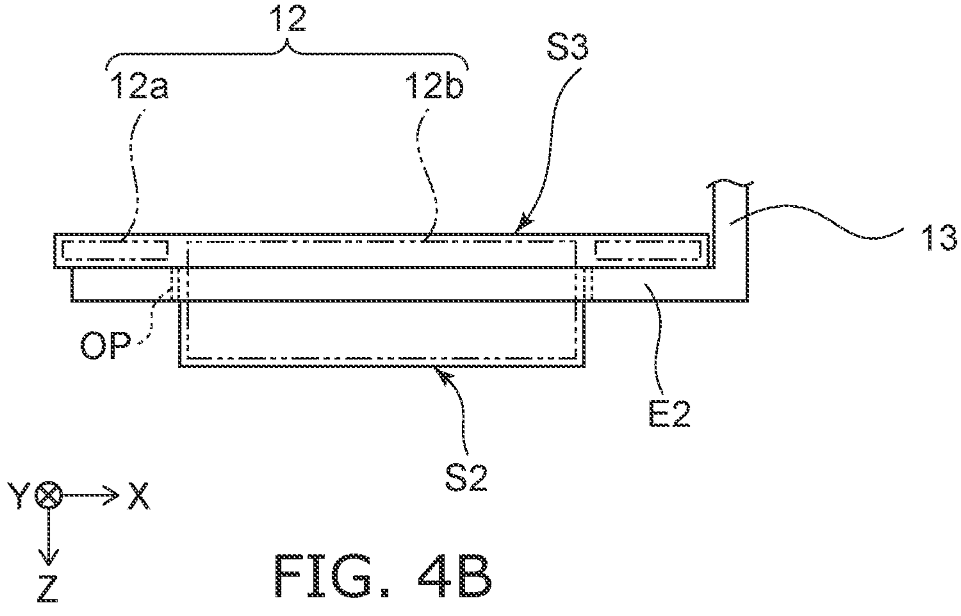

FIG. 4A and FIG. 4B are a bottom view and a side view showing a portion of the detection device according to the embodiment, respectively.

Figure 5A:
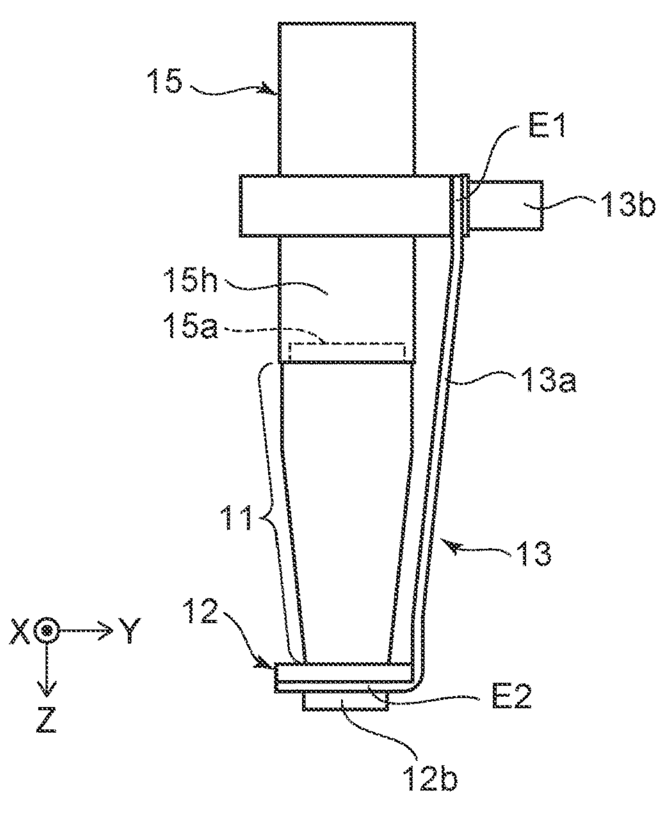
FIG. 5A and FIG. 5B are side views showing the detection device according to the embodiment.
Figure 5B:
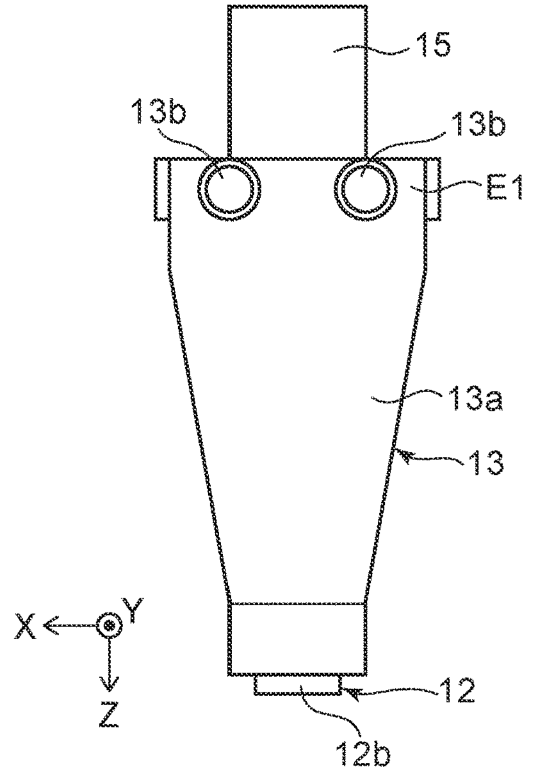

FIG. 5A and FIG. 5B are side views showing the detection device according to the embodiment.

As shown in FIG. 4A and FIG. 4B, the first portion 12*a* is pressed toward the first propagation member 11 by the fixture 13. Accordingly, the second propagation member 12 is in close contact with the first propagation member 11 so that no gap is formed between the first propagation member 11 and the second propagation member 12. For example, the first portion 12*a* is deformed, and a thickness thereof is reduced.

An opening OP is formed at the second end portion E2 of the plate member 13*a*. In the examples of FIG. 4A and FIG. 4B, the opening OP is a hole penetrating the second end portion E2 in a thickness direction of the second end portion E2. The thickness direction of the second end portion E2 is parallel to the Z-direction when the second end portion E2 presses the second propagation member 12.

The fixture 13 fixes the second propagation member 12 such that the second portion 12*b* protrudes further toward the Z-direction than the first portion 12*a* and the second end portion E2. Specifically, the second portion 12*b* of the second propagation member 12 is inserted into the opening OP. Accordingly, when the first portion 12*a* is pressed against the fixture 13, the second portion 12*b* protrudes further toward the Z-direction than the second end portion E2 of the fixture 13 as shown in FIG. 4B, FIG. 5A, and FIG. 5B. That is, as shown in FIG. 4B, a position of the second end portion E2 in the Z-direction is between the position of the second plane S2 in the Z-direction and the position of the third plane S3 in the Z-direction.

Since the second portion 12*b* protrudes further than the first portion 12*a*, a volume of the second portion 12*b* protruding from the second end portion E2 of the fixture 13 can be increased. That is, the volume of the second portion 12*b* deformed along the surface shape of the object can be increased. Accordingly, a space between the first propagation member 11 and the object is easily filled with the second propagation member 12.

Figure 6A:
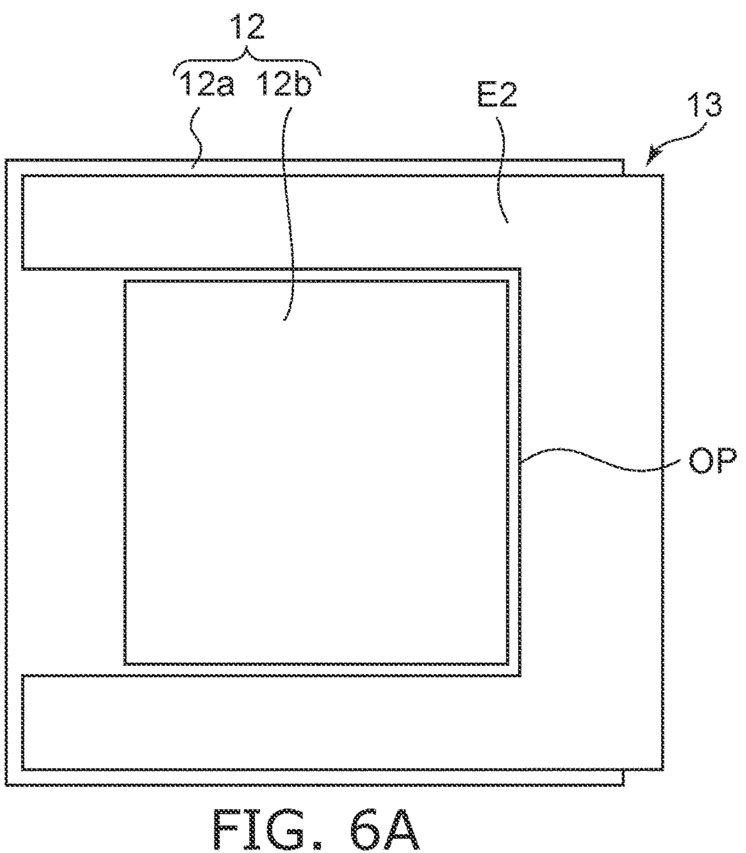
FIG. 6A and FIG. 6B are bottom views showing a portion of the detection device according to the embodiment.
Figure 6B:
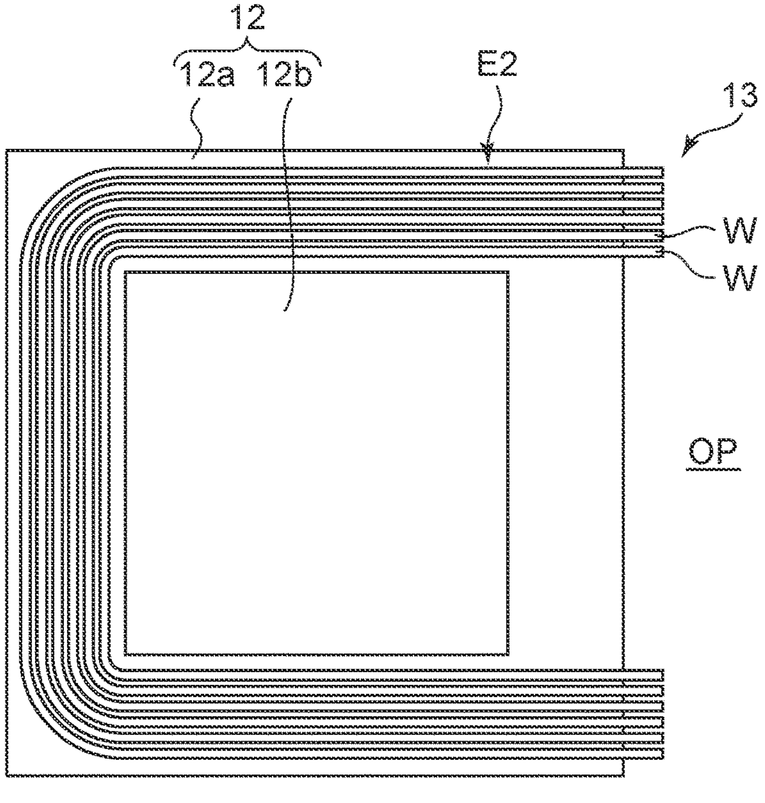
Figure 6B:
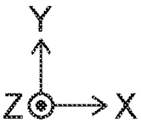

FIG. 6A and FIG. 6B are bottom views showing a portion of the detection device according to the embodiment.

As shown in FIG. 6A, the opening OP may extend in one direction in a slit shape. As shown in FIG. 6B, the plate member 13*a* may be formed of multiple wires W. The opening OP is formed at a position where the wires W are not provided.

Figures 7A, 7B:
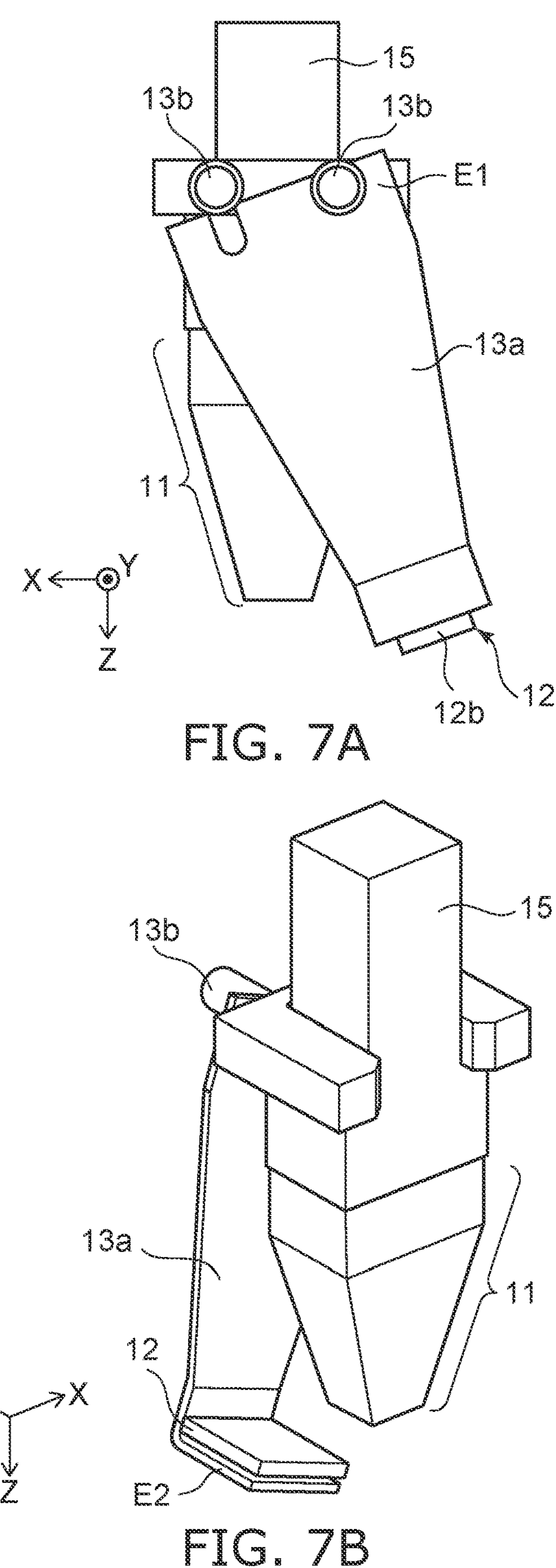
FIG. 7A and FIG. 7B are a side view and a perspective view showing the detection device according to the embodiment, respectively.

FIG. 7A and FIG. 7B are a side view and a perspective view showing the detection device according to the embodiment, respectively.

The fixture 13 detachably fixes the second propagation member 12 to the first propagation member 11. That is, by using the fixture 13, it is possible to switch between a state in which the second propagation member 12 is fixed to the first propagation member 11 and a state in which the second propagation member 12 is not fixed to the first propagation member 11.

For example, as shown in FIG. 7A and FIG. 7B, the plate member 13*a* can be detached from the housing 15*h* by loosening the fasteners 13*b*. When the plate member 13*a* is detached from the housing 15*h*, the second end portion E2 moves away from the first propagation member 11. That is, a distance between the second end portion E2 and the first propagation member 11 is increased. Accordingly, pressing from the second end portion E2 to the second propagation member 12 is eliminated. The second propagation member 12 is detachable. The second propagation member 12 can be detached so that another new second propagation member 12 can be attached.

Alternatively, the plate member 13*a* may be a plate spring. In this case, the second end portion E2 may be moved away from the first propagation member 11 by deforming the plate member 13*a*. This eliminates pressing from the second end portion E2 to the second propagation member 12, so that the second propagation member 12 is detachable.

FIG. 8A to FIG. 8D are side views schematically showing another fixture.

FIG. 8A and FIG. 8B show states in which the second propagation member 12 is fixed to the first propagation member 11. FIG. 8C and FIG. 8D show states in which the second propagation member 12 is not fixed to the first propagation member 11. FIG. 8B and FIG. 8D show states of the fixture 13 as viewed from viewpoints opposite to those of FIG. 8A and FIG. 8C, respectively.

As shown in FIG. 8A to FIG. 8D, slits S may be provided in the plate member 13*a*. The slits S extend along the Z-direction. When the fasteners 13*b* are loosened, the plate member 13*a* is slidable along a direction in which the slits S extend. When the plate member 13*a* slides, as shown in FIG. 8C and FIG. 8D, the second end portion E2 of the plate member 13*a* moves away from the first propagation member 11. This eliminates pressing from the second end portion E2 to the second propagation member 12, so that the second propagation member 12 is detachable.

Advantages of the embodiment will be described.

When inspection is performed using ultrasonic waves, it is favorable that air does not exist between the detection device and the object. Accordingly, propagation of the ultrasonic waves is improved, and the reflected waves are easily detected. As a result, for example, accuracy of the inspection is improved. In the related art, in order to improve the propagation of ultrasonic waves, a couplant liquid having a good acoustic impedance is used. By bringing the detection device into contact with an object to which the couplant liquid has been applied in advance, a space between the detection device and the object is filled with the couplant liquid.

In the case of using the couplant liquid, it is necessary to wipe off the couplant liquid after the inspection. If the couplant liquid remains attached to the object, a surface of the object may be altered (for example, rusted) or deteriorated. However, it takes time to wipe off the couplant liquid. In order to shorten an inspection time, a technique capable of omitting application and wiping of the couplant liquid is required.

Regarding this problem, the detection device 10 according to the embodiment can use the second propagation member 12 instead of the couplant liquid. The second propagation member 12 is softer than the first propagation member 11, and is deformable according to the surface shape of the object when the detection device 10 operates. By deforming the second propagation member 12 and filling the space between the first propagation member 11 and the object with the second propagation member 12, air between the first propagation member 11 and the object can be reduced.

On the other hand, since the second propagation member 12 is soft, the second propagation member 12 is easily damaged. A foreign matter (for example, metal powder) adhering to the object tends to stick into the second propagation member 12. If an abnormality such as a scratch or adhesion of a foreign matter occurs on a surface of the second propagation member 12, it becomes difficult for the ultrasonic waves to propagate between the second propagation member 12 and the object. This decreases detection accuracy of the ultrasonic waves. Therefore, it is favorable that the second propagation member 12 is replaced at an appropriate timing. In the detection device 10, the second propagation member 12 is detachably fixed by the fixture 13. Therefore, the second propagation member 12 can be easily replaced.

According to the embodiment, it is possible to provide the detection device 10 that does not require the couplant liquid and that allows the second propagation member 12 to be easily replaced.

Figure 9A:
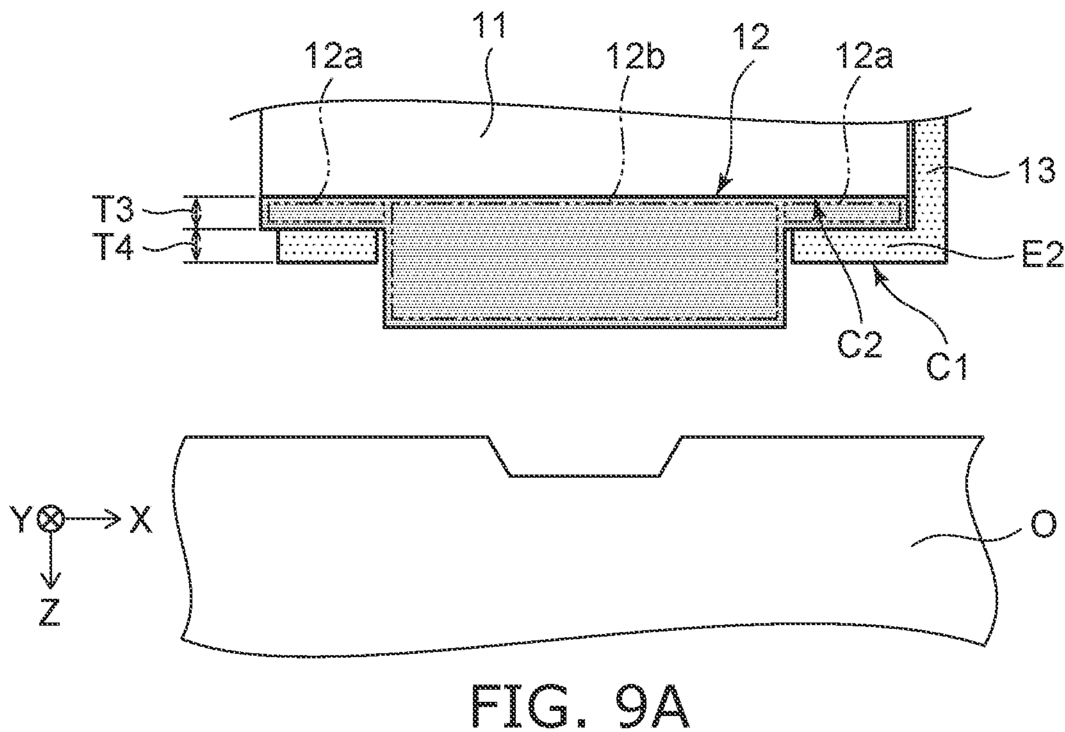
FIG. 9A and FIG. 9B are side views showing a distal end of the detection device according to the embodiment.
Figure 9B:
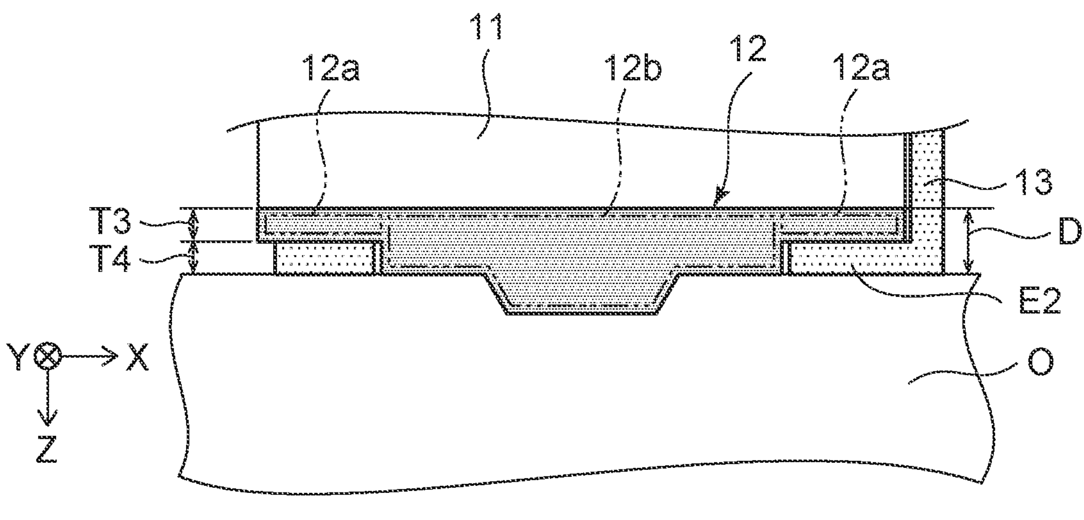

FIG. 9A and FIG. 9B are side views showing a distal end of the detection device according to the embodiment.

FIG. 9A shows a state before the second propagation member 12 comes into contact with an object O. FIG. 9B shows a state after the second propagation member 12 comes into contact with the object O. As shown in FIG. 9A and FIG. 9B, the second portion 12*b* of the second propagation member 12 is deformed and compressed when the second propagation member 12 comes into contact with the object O. This reduces a thickness of the second portion 12*b*.

The second portion 12*b* is deformed such that the fixture 13 also comes into contact with the object O. The fixture 13 is harder than the second propagation member 12 and has sufficient rigidity. Therefore, unlike the second propagation member 12, the fixture 13 is substantially not deformed even when the fixture 13 comes into contact with the object O. The first portion 12*a* that has been pressed by the fixture 13 is also less likely to be deformed than the second portion 12*b*. When the fixture 13 comes into contact with the object O, a distance D between the first propagation member 11 and the object O is easily determined. This can reduce variations in the distance D caused by a degree of deformation of the second propagation member 12.

The fixture 13 includes a first contact surface C1 that comes into contact with the object O. The first contact surface C1 faces the Z-direction. For example, the second end portion E2 of the plate member 13*a* includes the first contact surface C1. In this example, the first contact surface C1 is formed by one surface. The first contact surface C1 may be formed by multiple lines or multiple points. The first propagation member 11 includes a second contact surface C2 that comes into contact with the second propagation member 12. It is favorable that the first contact surface C1 is parallel to the second contact surface C2. For example, the first contact surface C1 and the second contact surface C2 are parallel to the X-direction and the Y-direction, which are arrangement directions of multiple detection elements to be described later.

When the second portion 12*b* comes into contact with the object O and is compressed, the first contact surface C1 of the fixture 13 comes into contact with the object O. When the first contact surface C1 and the second contact surface C2 are parallel to each other, the distance D is determined by a thickness T3 of the deformed first portion 12*a* and a thickness T4 of the second end portion E2. For example, the distance D can be set to a predetermined value by pressing the detection device 10 toward the object O until the first contact surface C1 comes into surface contact with the object O. Furthermore, variations in the distance D at each point in the X-Y plane can be reduced. Accordingly, variations in an intensity of the reflected waves for each probing can be reduced, and variations in an intensity of the reflected waves at each point in the X-Y plane can be reduced.

The expression "parallel" may include not only strictly parallel but also, for example, variations in manufacturing processes. An inclination may exist between the first contact surface C1, the second contact surface C2, and the arrangement direction within a range in which no problem occurs in detection. For example, any two of the first contact surface C1, the second contact surface C2, and the arrangement direction can be considered substantially parallel to each other as long as an angle between the two is larger than −5 degrees and smaller than +5 degrees.

Hereinafter, a structure of the detector 15, a detection system including the detection device 10, inspection using an ultrasonic wave, and determination of soundness of the detection device 10 will be specifically described.

Structure of Detector

Figure 10:
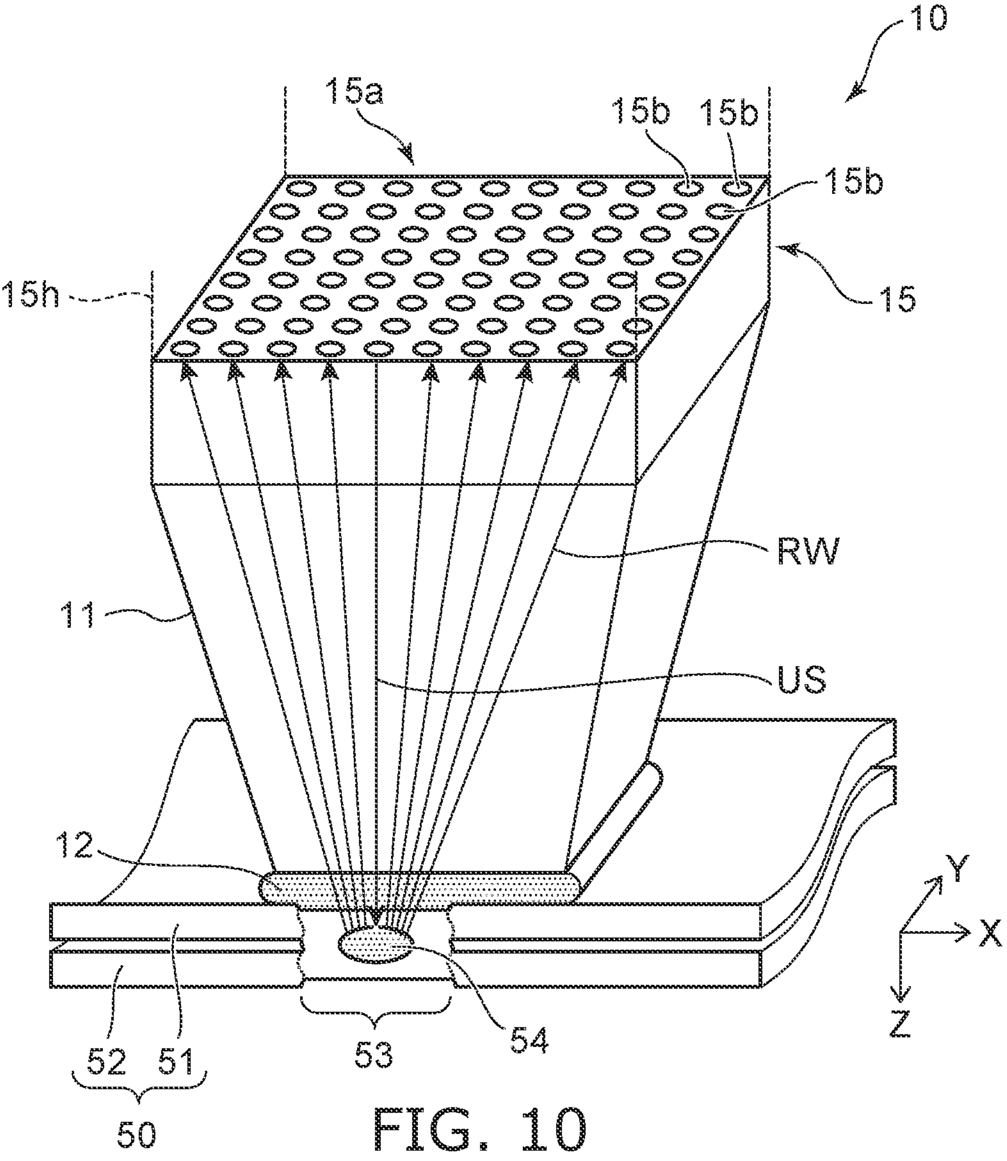
FIG. 10 is a perspective view showing a distal end of the detection device according to the embodiment.

FIG. 10 is a perspective view showing a distal end of the detection device according to the embodiment.

As shown in FIG. 10, the element array 15*a* is provided inside the detector 15. The element array 15*a* includes multiple detection elements 15*b*. Each of the detection elements 15*b* is, for example, a transducer and emits ultrasonic waves of a frequency of 1 MHz or more and 100 MHz or less. The multiple detection elements 15*b* are arranged along the X-direction and the Y-direction.

FIG. 10 shows a state in which a bonded body 50 is inspected. The bonded body 50 is produced by spot welding a metal member 51 (a first member) and a metal member 52 (a second member) at a welded portion 53. At the welded portion 53, a solidified portion 54 is formed by melting a portion of the metal member 51 and a portion of the metal member 52 and mixing and solidifying the melted portions. The detection elements 15*b* transmit ultrasonic waves US toward the bonded body 50 and receive reflected waves RW from the bonded body 50.

As a more specific example, as shown in FIG. 10, one detection element 15*b* transmits the ultrasonic waves US toward the welded portion 53. A part of the ultrasonic waves US is reflected by an upper surface, a lower surface, or the like of the bonded body 50. The multiple detection elements 15*b* receive (detect) the reflected waves RW. The detection elements 15*b* sequentially transmit the ultrasonic waves US, and the reflected waves RW are detected by the multiple detection elements 15*b*. Accordingly, a detection result of the reflected waves indicating a state in the vicinity of the welded portion 53 is obtained.

Figure 11:
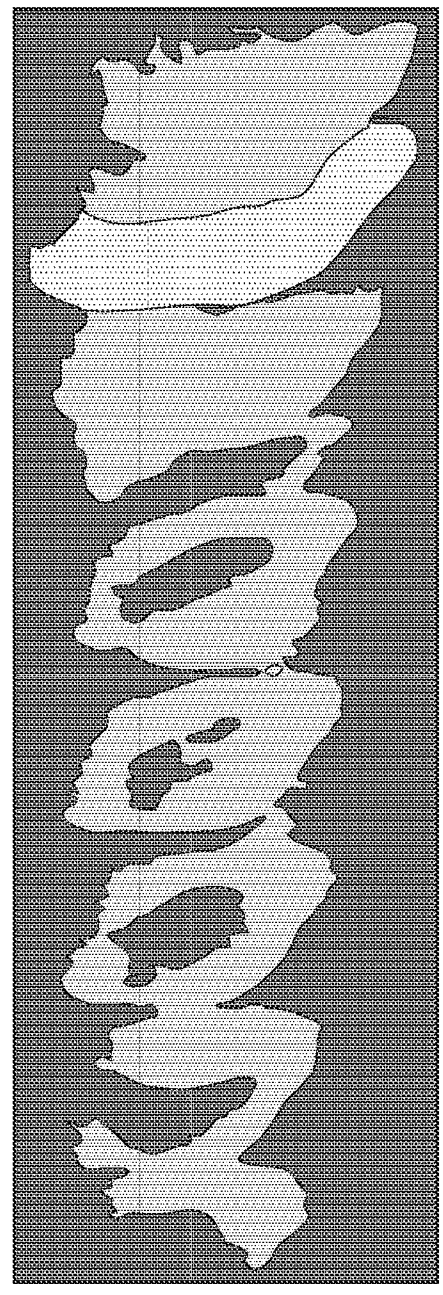
FIG. 11 is a schematic diagram illustrating a three-dimensional detection result obtained by probing.
Figure 11:
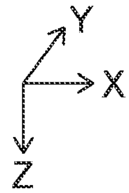

FIG. 11 is a schematic diagram illustrating a three-dimensional detection result obtained by probing.

In the probing, as described above, the detection elements 15*b* sequentially transmit ultrasonic waves, and reflected waves are detected by the multiple detection elements 15*b*. In the specific example shown in FIG. 10, 80 (10×8) detection elements 15*b* are provided. In this case, the 80 detection elements 15*b* sequentially transmit ultrasonic waves. Each detection element 15*b* repeatedly detects reflected waves 80 times. A detection result of a reflected wave intensity distribution in the Z-direction is output 80 times from each detection element 15*b*. Intensity distributions of the 80 reflected waves output from each detection element 15*b* are summed. A summed intensity distribution is an intensity distribution at coordinates where each detection element 15*b* is provided in each probing. A similar process is executed on detection results obtained by the 80 detection elements 15*b*. Accordingly, the intensity distributions of the reflected waves in the Z-direction are generated at points in the X-Y plane. FIG. 11 illustrates a three-dimensional intensity distribution by an image. In FIG. 11, a portion having high luminance is a portion having a high intensity of reflected waves of ultrasonic waves. Data on a three-dimensional intensity distribution is used for the inspection.

Detection System

Figure 12:
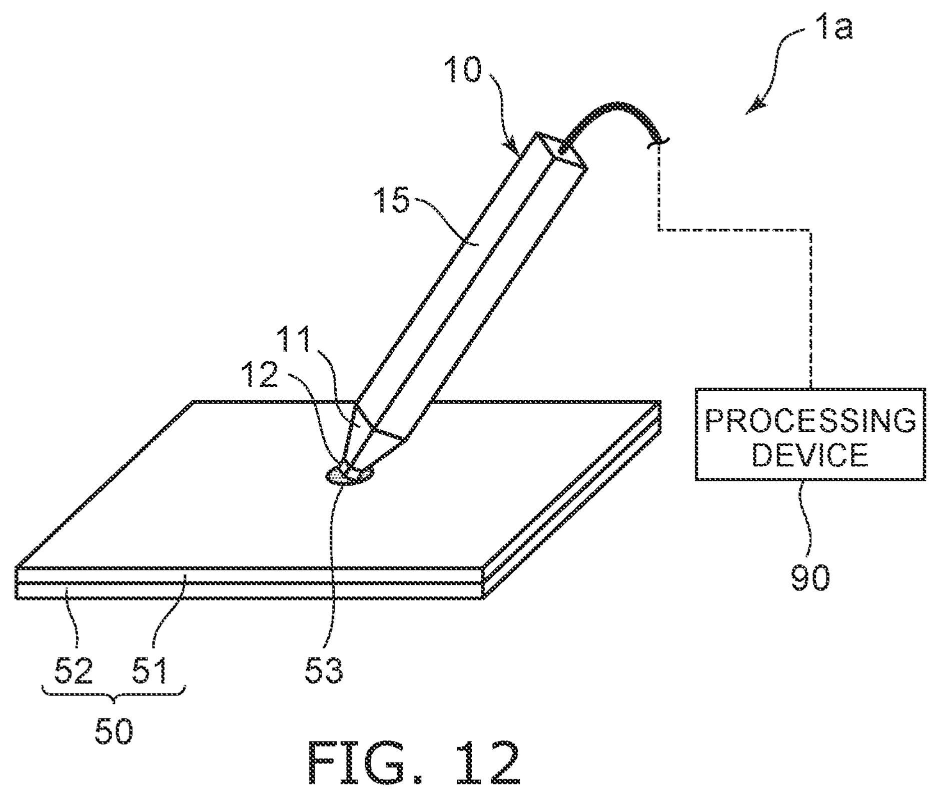
FIG. 12 is a schematic diagram showing a detection system according to the embodiment.

FIG. 12 is a schematic diagram showing a detection system according to the embodiment.

A detection system 1*a* includes the detection device 10 and a processing device 90. In the detection system 1*a*, the detection device 10 has such a shape that the detection device 10 can be held by a human hand. An inspector who grips the detection device 10 brings the second propagation member 12 at the distal end of the detection device 10 into contact with the welded portion 53 and inspects the welded portion 53. At this time, the inspector presses the second propagation member 12 against the bonded body 50 such that the second propagation member 12 is deformed along a shape of the welded portion 53. For example, the inspector presses the second propagation member 12 against the bonded body 50 until the first contact surface C1 of the fixture 13 comes into contact with the bonded body 50. In a state in which the detection device 10 is in contact with the welded portion 53, the inspector performs probing.

The processing device 90 controls the element array 15*a*. In the probing, an electrical signal is transmitted from the processing device 90 to each detection element 15*b*, and ultrasonic waves are transmitted from each detection element 15*b*. Each detection element 15*b* outputs an electrical signal in response to detection of a reflected wave. A magnitude of the electrical signal corresponds to an intensity of the reflected wave. Each detection element 15*b* transmits intensity data indicating the intensity of the detected reflected waves to the processing device 90. The processing device 90 executes various types of processes based on the intensity data.

Figure 13:
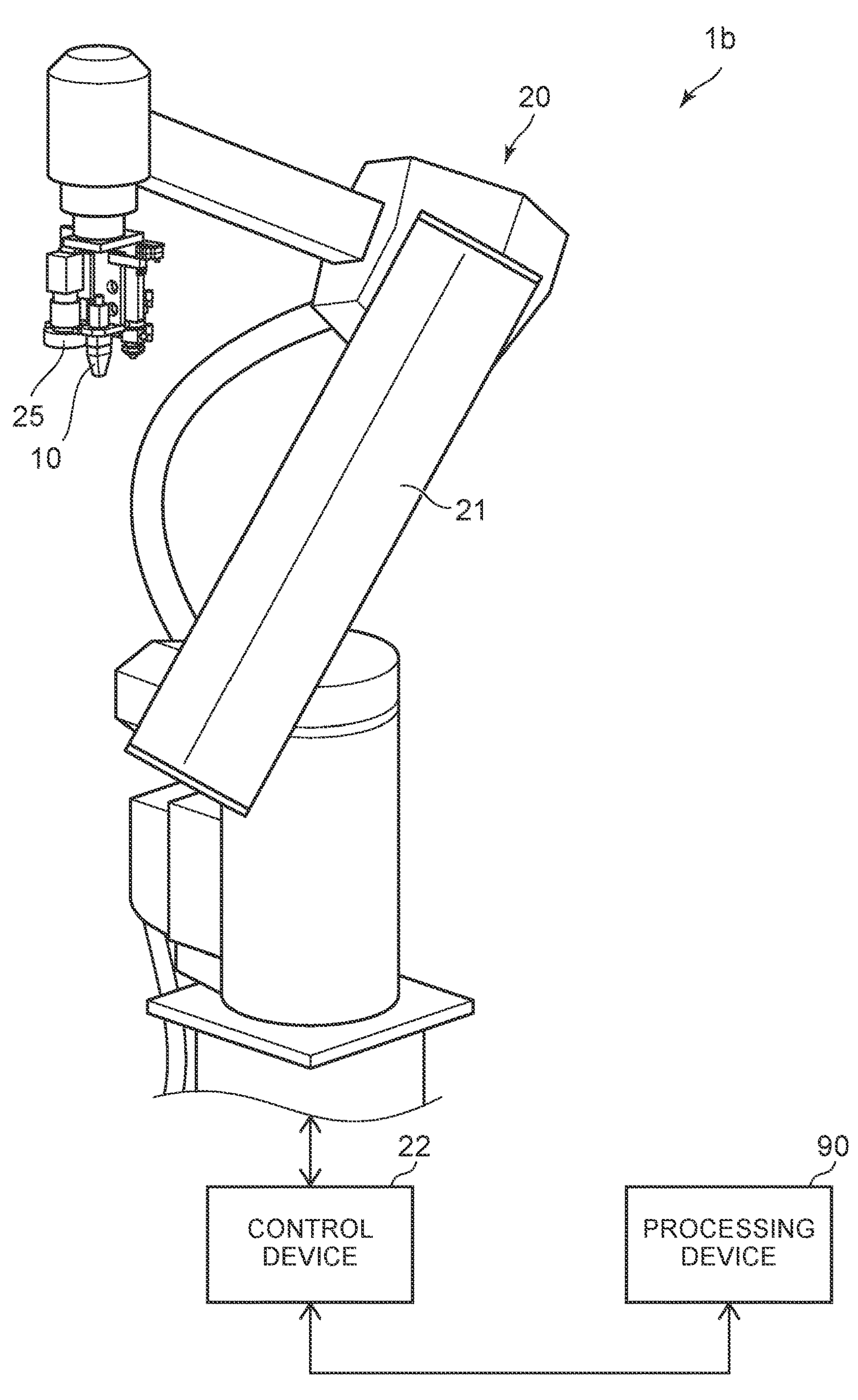
FIG. 13 is a schematic diagram showing another detection system according to the embodiment.

FIG. 13 is a schematic diagram showing another detection system according to the embodiment.

A detection system 1*b* shown in FIG. 13 includes a robot 20 and the processing device 90. The robot 20 includes a manipulator 21 and a control device 22.

In the example shown in FIG. 13, the manipulator 21 is of a vertical articulated type. The manipulator 21 may be of a horizontal articulated type or a parallel link type. The control device 22 controls an operation of the manipulator 21. The control device 22 is a so-called robot controller.

As shown in FIG. 13, the detection device 10 and an imaging device 25 are provided at a distal end of the manipulator 21. The imaging device 25 images a welded member and acquires an image. The processing device 90 extracts welding marks from the obtained image and detects a position of the welded portion 53. The control device 22 operates the manipulator 21 such that the distal end of the detection device 10 comes into contact with the welded portion 53.

Inspection

FIG. 14A to FIG. 14C are schematic diagrams illustrating an inspection method using the detection device according to the embodiment.

The detection result (intensity data) of the reflected waves obtained by the detection system 1*a* or 1*b* shown in FIG. 12 or FIG. 13 can be applied to inspection of the welded portion 53. The processing device 90 may execute the following processes using the intensity data.

As shown in FIG. 14A, a part of the ultrasonic waves US is reflected by an upper surface 51*a* of the metal member 51 or an upper surface 53*a* of the welded portion 53. Another part of the ultrasonic waves US enters the bonded body 50 and is reflected by a lower surface 51*b* of the metal member 51 or a lower surface 53*b* of the welded portion 53.

Positions of the upper surface 51*a*, the lower surface 51*b*, the upper surface 53*a*, and the lower surface 53*b* in the Z-direction are different from one another. That is, distances in the Z-direction between these surfaces and the detection element 15*b* are different from one another. When the detection element 15*b* detects reflected waves from these surfaces, peaks of an intensity of the reflected waves are detected. By calculating the time after the ultrasonic waves US are transmitted until each peak is detected, it is possible to determine which surface the ultrasonic waves US are reflected.

FIG. 14B and FIG. 14C are graphs illustrating a relation between a time after transmitting the ultrasonic waves US and an intensity of the reflected waves RW. Here, the intensity of the reflected waves RW is represented by an absolute value. The graph in FIG. 14B illustrates detection results of reflected waves RW from the upper surface 51*a* and the lower surface 51*b* of the metal member 51. The graph in FIG. 14C illustrates detection results of reflected waves RW from the upper surface 53*a* and the lower surface 53*b* of the welded portion 53.

In the graphs in FIG. 14B and FIG. 14C, a peak Pe10 is based on the reflected waves RW from a boundary surface between the first propagation member 11 and the second propagation member 12. A peak Pe11 is based on the reflected waves RW from the upper surface 51*a*. A peak Pe12 is based on the reflected waves RW from the lower surface 51*b*. A time from the transmission of the ultrasonic waves US to the detection of the peak Pe11 and the peak Pe12 corresponds to the positions of the upper surface 51*a* and the lower surface 51*b* of the metal member 51 in the Z-direction.

Similarly, a peak Pe13 is based on the reflected waves RW from the upper surface 53*a*. A peak Pe14 is based on the reflected waves RW from the lower surface 53*b*. A time from the transmission of the ultrasonic waves US to the detection of the peak Pe13 and the peak Pe14 corresponds to the positions of the upper surface 53*a* and the lower surface 53*b* of the welded portion 53 in the Z-direction.

The processing device 90 determines whether the peak Pe12 exists in the reflected wave intensity distribution in the Z-direction at each point in the first plane. The first plane is parallel to the X-direction and the Y-direction. As a specific example, the processing device 90 detects a peak in a predetermined range in the Z-direction in which the peak Pe12 can be detected. The predetermined range is set in advance based on a length of the first propagation member 11 in the Z-direction, a distance between the first propagation member 11 and the metal member 51, and the like. The processing device 90 compares an intensity of a peak with a predetermined threshold. When the peak is more than the threshold, the processing device 90 determines that the peak is the peak Pe12. The existence of the peak Pe12 indicates that the lower surface 51*b* exists at a position of the peak Pe12 and the metal members 51 and 52 are not bonded. The processing device 90 determines that a point at which the peak Pe12 is detected is not bonded. The processing device 90 sequentially determines whether each point in the first plane is bonded. A set of points determined to be bonded corresponds to the welded portion 53. For example, in the inspection, it is checked whether the welded portion 53 is formed. In the inspection, it is checked how long a diameter of the welded portion 53 is and whether it is sufficient.

The intensity of the reflected waves may be expressed in any form. For example, an intensity of reflected waves output from the detection element 15*b* includes a positive value and a negative value depending on a phase. Various types of processes may be executed based on the intensity of the reflected waves including the positive value and the negative value. The intensity of the reflected waves including the positive value and the negative value may be converted into an absolute value. An average value of the intensity of the reflected waves may be subtracted from an intensity of reflected waves at each time. Further, a weighted average value, a weighted moving average value, or the like of the intensity of the reflected waves may be subtracted from the intensity of the reflected waves at each time. A result obtained by adding the processes to the intensity of the reflected waves can also be subjected to the various types of processes described in the application.

Determination for Soundness

The processing device 90 may determine the soundness of the detection device 10. Specifically, the processing device 90 appropriately determines whether the reflected waves are appropriately detected. The reflected waves are not appropriately detected if fixation of the second propagation member 12 by the fixture 13 is inappropriate, or if a scratch or a foreign matter exists on the surface of the second propagation member 12 (the second plane S2), or the like. An inappropriate detection result of the reflected waves causes an erroneous inspection result.

Figure 15:
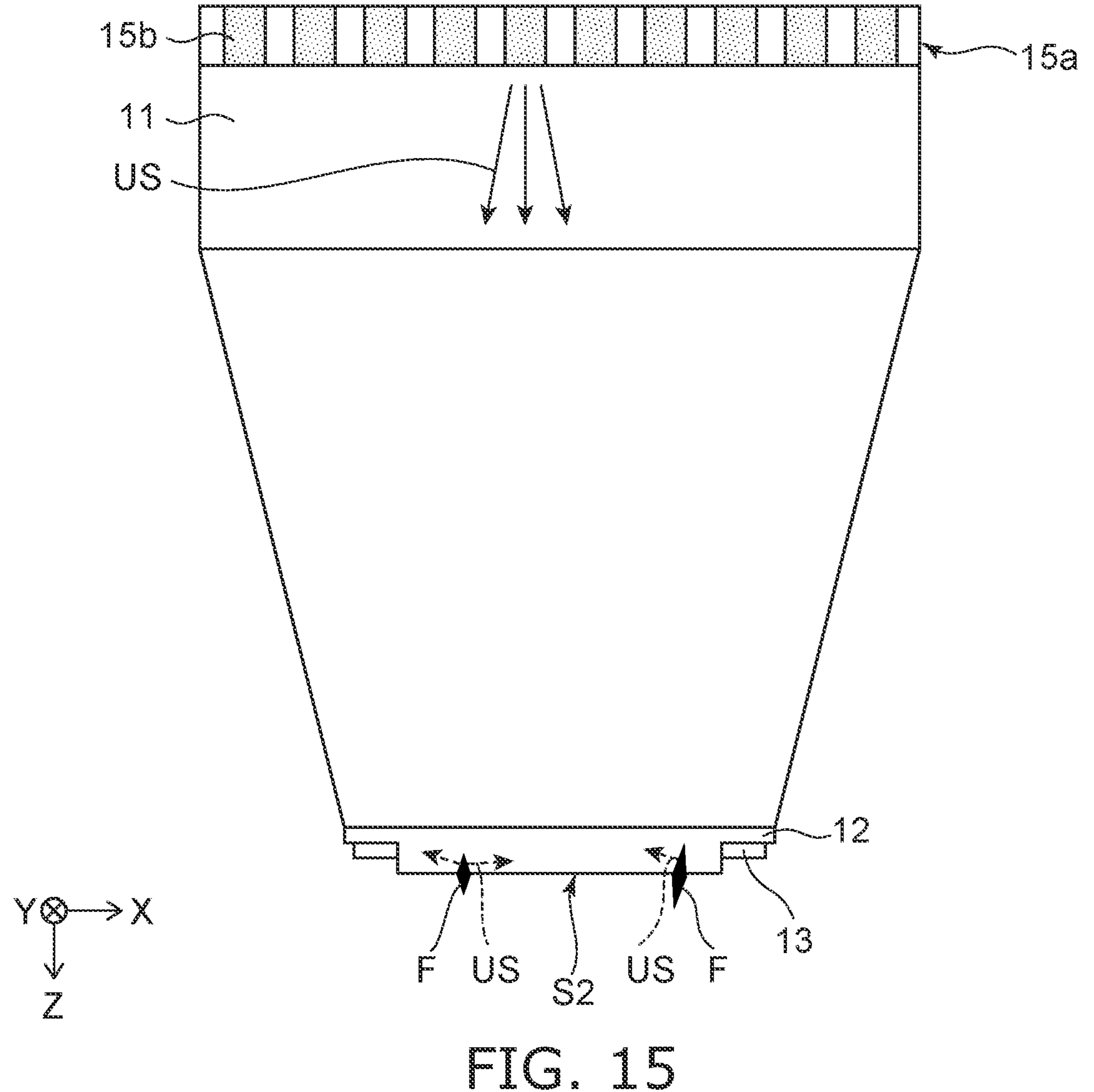
FIG. 15 is a schematic diagram showing a portion of the detection device according to the embodiment.

FIG. 15 is a schematic diagram showing a portion of the detection device according to the embodiment.

When the detection device 10 is brought into contact with the object to be inspected, a foreign matter F may adhere to the second propagation member 12 as shown in FIG. 15. The foreign matter F is, for example, fine metal particles. When the foreign matter F adheres to the second propagation member 12, the ultrasonic waves US are scattered by the foreign matter F on the surface of the second propagation member 12. The reflected waves RW advancing toward the element array 15*a* decrease, and an intensity of reflected waves detected by the element array 15*a* decreases. In addition to the foreign matter F, when a scratch exists on the surface, the ultrasonic waves US are also scattered by the scratch. If an abnormality such as a foreign matter or a scratch exists on the surface, the intensity of the detected reflected waves decreases. If a detection result obtained at this time is used for the inspection of the welded portion 53, an appropriate inspection result related to the welded portion 53 cannot be obtained. In the determination for the soundness, the processing device 90 determines whether the surface of the second propagation member 12 is normal.

Figure 16:
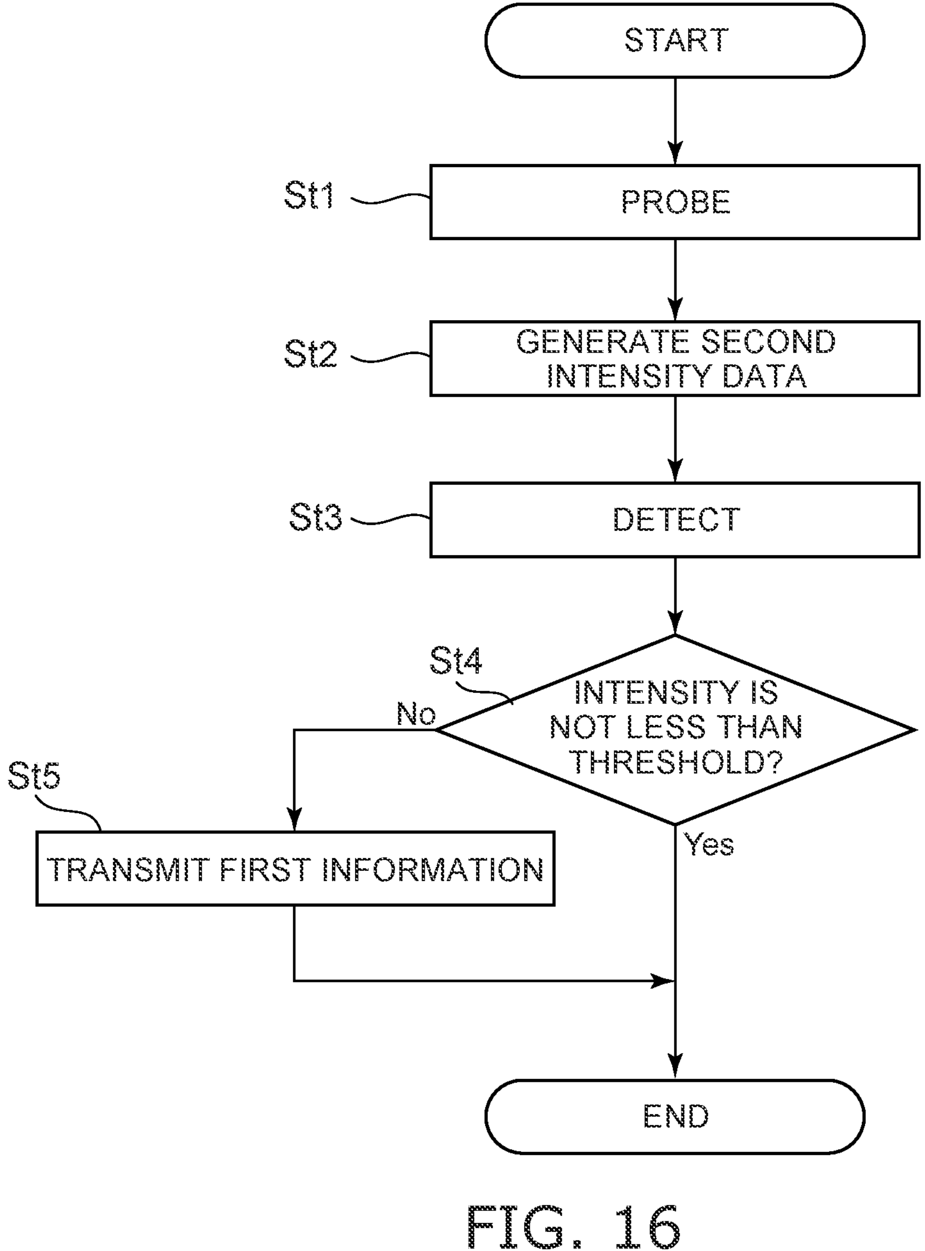
FIG. 16 is a flowchart showing a method of determining soundness.

FIG. 16 is a flowchart showing a method of determining soundness.

The detection device 10 executes probing (step St1). By probing, multiple pieces of first intensity data are acquired by the multiple detection elements 15*b*. The probing may be executed on the object to be inspected, or may be executed on a sample (test piece) for determining the soundness. The processing device 90 receives the multiple pieces of first intensity data. The processing device 90 generates second intensity data by using at least part of the multiple pieces of first intensity data (step St2). The second intensity data is a sum of at least part of the multiple pieces of first intensity data. The second intensity data may be an average or a weighted average of at least part of the multiple pieces of intensity data.

Figure 17:
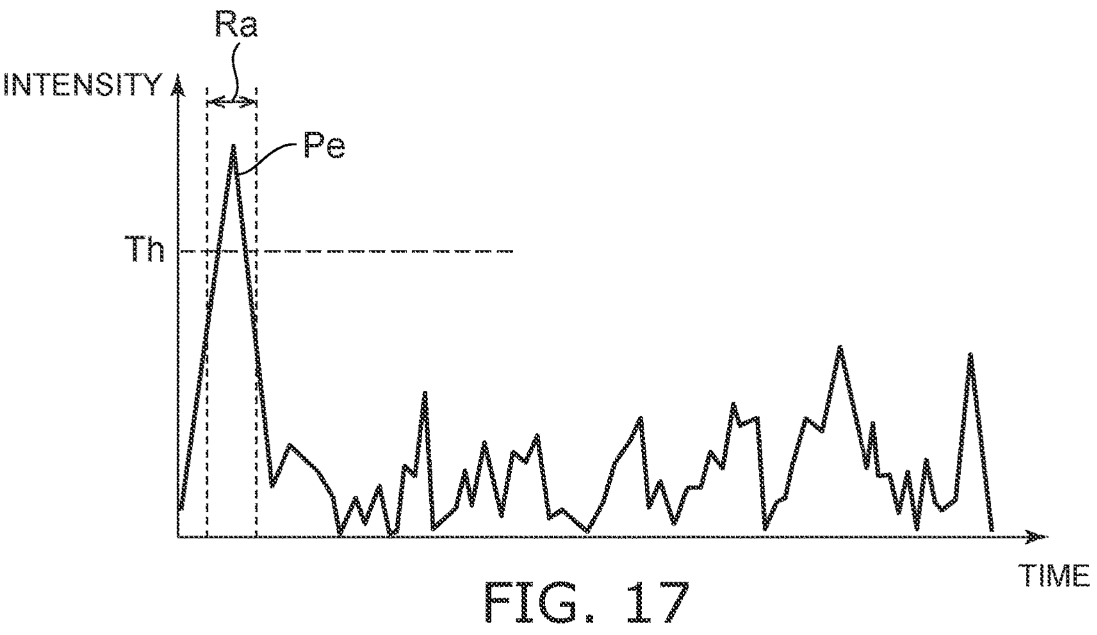
FIG. 17 is a schematic diagram illustrating second intensity data.

FIG. 17 is a schematic diagram illustrating the second intensity data.

In FIG. 17, a horizontal axis represents an elapsed time after the ultrasonic waves are transmitted. The elapsed time corresponds to a position in the Z-direction. A vertical axis represents the intensity of the reflected waves at each time. In FIG. 17, the intensity is represented by an absolute value.

As a specific example, every time one detection element 15*b* shown in FIG. 10 transmits the ultrasonic waves US, 80 detection elements 15*b* detect the reflected waves RW. When the 80 detection elements 15*b* transmit the ultrasonic waves US, 6400 detection results (first intensity data) are obtained in total. The processing device 90 sums intensity distributions of 6400 pieces of first intensity data in the Z-direction. Accordingly, the second intensity data is generated.

The processing device 90 detects an intensity of a part of the reflected waves in the second intensity data (step St3). For example, as illustrated in FIG. 17, a range Ra in which the reflected waves from the second plane S2 in the Z-direction can be detected is set in advance. The processing device 90 compares an intensity of the reflected waves in the range Ra with a preset threshold (step St4). If the intensity is not less than the threshold, the processing device 90 determines that the second propagation member 12 is normal. If the intensity is less than the threshold, the processing device 90 determines that the second propagation member 12 is abnormal.

As a specific example, as illustrated in FIG. 17, the processing device 90 detects a peak Pe having a largest intensity in the range Ra. The processing device 90 compares an intensity of the peak Pe with a threshold Th. If the intensity of the peak Pe is not less than the threshold Th, the processing device 90 determines that the second propagation member 12 is normal. If the intensity of the peak Pe is less than the threshold Th, the processing device 90 determines that the second propagation member 12 is abnormal. In addition to the intensity of the peak, the processing device 90 may compare an integrated value or an average value of the intensity in the range Ra with the threshold Th to determine a state of the second propagation member 12.

When the second propagation member 12 is determined to be abnormal, the processing device 90 transmits first information (step St5). The first information indicates that the second propagation member 12 is abnormal. According to the transmission of the first information, the inspector can be prompted to replace the second propagation member 12 or to inspect the detection device 10. After the transmission of the first information or if the second propagation member 12 is normal, the processing device 90 ends the determination.

Specific contents of the determination process can be appropriately changed. For example, when the second propagation member 12 is determined to be normal, the processing device 90 may transmit information indicating that the second propagation member 12 is normal. The second intensity data may be generated using only a part of the multiple pieces of first intensity data. For example, when the foreign matter F mainly adheres to an outer peripheral portion of the second surface S2, the second intensity data may be generated using the first intensity data from the detection elements 15*b* positioned at an outer peripheral portion of the element array 15*a*.

The range Ra is set based on the length of the first propagation member 11 in the Z-direction and the distance between the first propagation member 11 and the bonded body 50. The threshold Th is set based on an intensity of reflected waves from the second surface S2 when the second propagation member 12 is in a normal state and variations in the detection result of the intensity of the reflected waves. As shown in FIG. 9, a peak of the reflected waves from the second surface S2 appears easily in the range Ra by determining the distance D between the first propagation member 11 and the object O. Accordingly, determination accuracy of the soundness can be improved.

When the first information is transmitted from the processing device 90, a user replaces the second propagation member 12. The detection system 1*a* or 1*b* may determine the soundness after the second propagation member 12 is replaced and before the probing. Thus, it is possible to check whether the replaced second propagation member 12 is normal. The processing device 90 may determine the soundness when a predetermined time has come, when a predetermined period has elapsed from the last determination, or when the probing is executed.

The second propagation member 12 may be automatically replaced. Hereinafter, each unit that automatically replaces the second propagation member 12 will be described.

Figure 18:
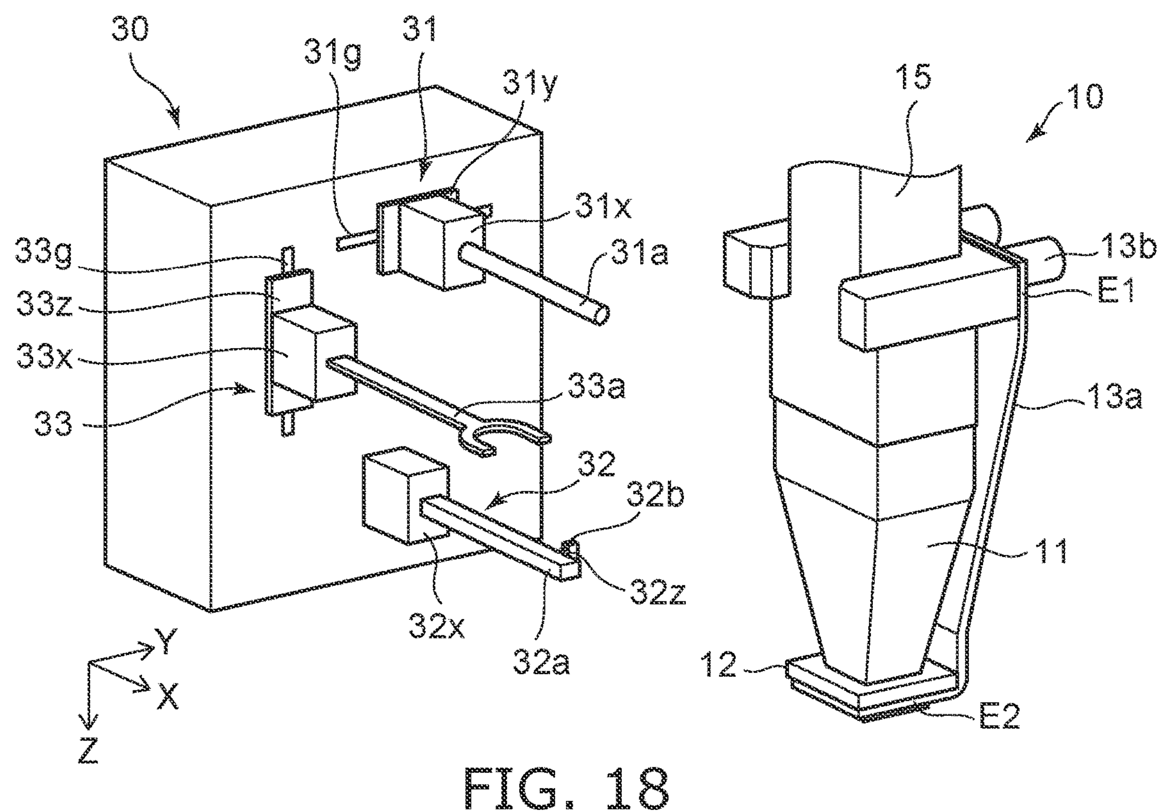
FIG. 18 is a schematic diagram showing each unit that replaces the second propagation member.

FIG. 18 is a schematic diagram showing each unit that replaces the second propagation member 12.

The detection system 1*a* or 1*b* includes a release unit 31, an extrusion unit 32, and a transport unit 33 shown in FIG. 18.

The release unit 31 includes a bar 31*a*, a drive unit 31*x*, and a drive unit 31*y*. The bar 31*a* is a member extending in a direction intersecting the Z-direction. The drive unit 31*x* moves the bar 31*a* in the X-direction. The drive unit 31*y* moves the bar 31*a* and the drive unit 31*x* in the Y-direction along a guide 31*g*. The bar 31*a* is hooked on the plate member 13*a* and deforms the plate member 13*a*. Accordingly, the fixation of the second propagation member 12 by the fixture 13 is released. A specific shape of the bar 31*a* is optional as long as the bar 31*a* extends in one direction. For example, a distal end of the bar 31*a* may be curved or hooked.

The extrusion unit 32 includes a bar 32*a*, an extrusion portion 32*b*, a drive unit 32*x*, and a drive unit 32*z*. The bar 32*a* is a member extending in a direction intersecting the Z-direction. The extrusion portion 32*b* is attached to a distal end of the bar 32*a* via the drive unit 32*z*. The drive unit 32*z* moves the extrusion portion 32*b* in the Z-direction. The drive unit 32*x* moves the bar 32*a* in the X-direction.

In a state where the extrusion portion 32*b* is positioned below the second propagation member 12 placed on the second end portion E2, the extrusion portion 32*b* moves in the Z-direction. The extrusion portion 32*b* comes into contact with the second propagation member 12. The second propagation member 12 is extruded out by the extrusion portion 32*b* and floats from the second end portion E2. Accordingly, the second propagation member 12 can be detached from the second end portion E2.

The transport unit 33 includes a holding unit 33*a*, a drive unit 33*x*, and a drive unit 33*z*. The holding unit 33*a* extends in a direction intersecting the Z-direction. A distal end of the holding unit 33*a* has a structure that can hold the second propagation member 12. In the example of FIG. 18, a claw is provided at the distal end of the holding unit 33*a*. The holding unit 33*a* holds the second propagation member 12 by hooking the second propagation member 12 on the claw. An intake port may be provided at the distal end of the holding unit 33*a*, and the second propagation member 12 may be held by vacuum suction.

The drive unit 33*x* moves the holding unit 33*a* in the X-direction. The drive unit 33*z* moves the drive unit 33*x* and the holding unit 33*a* in the Z-direction. The transport unit 33 holds and transports the second propagation member 12. The transport unit 33 transports, to the second end portion E2, a new second propagation member 12 from a placement place where the new second propagation member 12 is placed.

For example, the drive units 31*x*, 32*x*, and 33*x* include an air cylinder. The drive units 31*y*, 32*z*, and 33*z* include a motor.

For example, as shown in FIG. 18, the release unit 31, the extrusion unit 32, and the transport unit 33 may be configured as a single replacement device 30. Further, the release unit 31, the extrusion unit 32, and the transport unit 33 may be provided separately. In this case, moving directions of the bar 31*a*, the bar 32*a*, and the holding unit 33*a* may be different from one another.

FIGS. 19A to 19D and FIGS. 20A to 20D are schematic diagrams showing an operation of each unit that replaces the second propagation member.

Figures 19A, 19B:
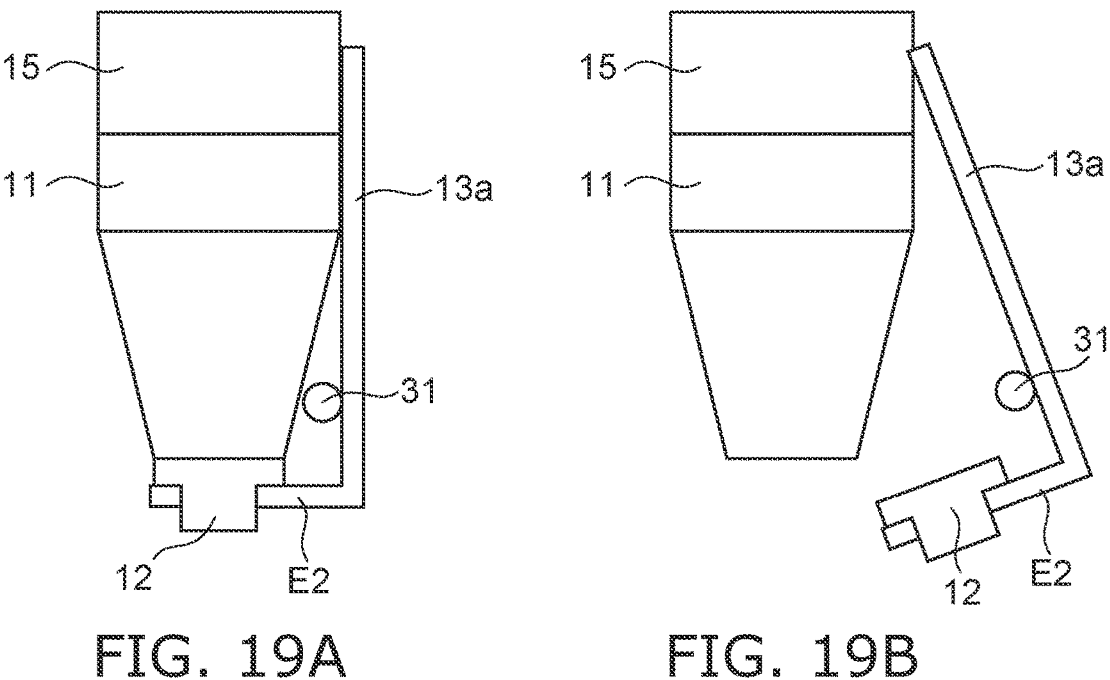
FIGS. 19A to 19D are schematic diagrams showing an operation of each unit that replaces the second propagation member.

As shown in FIG. 19A, the bar 31*a* of the release unit 31 is inserted between the first propagation member 11 and the plate member 13*a*. As shown in FIG. 19B, the release unit 31 moves the bar 31*a* in a direction away from the first propagation member 11. Accordingly, the plate member 13*a* is deformed, and the fixation of the second propagation member 12 is released. The second propagation member 12 moves away from the first propagation member 11. The extrusion unit 32 raises the extrusion portion 32*b* in the state that the distal end of the extrusion portion 32*b* is positioned below the second end portion E2. Accordingly, as shown in FIG. 19C, the second propagation member 12 is extruded out from the second end portion E2.

Figures 19C, 19D:
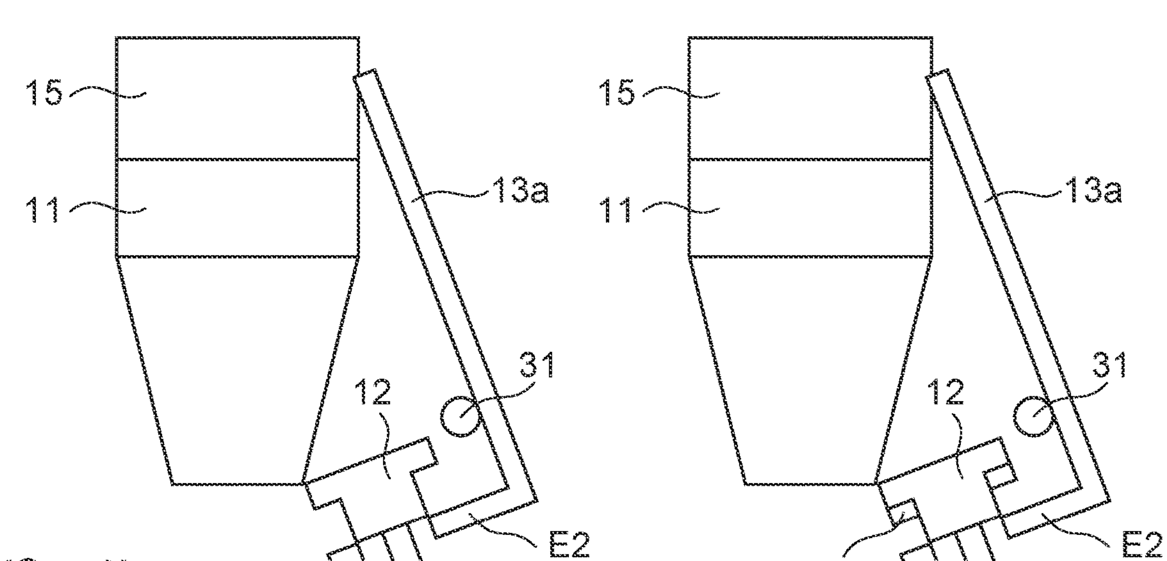

As shown in FIG. 19D, the transport unit 33 sandwiches the second portion 12*b* with the holding unit 33*a* and holds the extruded second propagation member 12. When the opening OP of the second end portion E2 has a slit shape as shown in FIG. 6A, an extrusion amount of the second propagation member 12 by the extrusion unit 32 may be smaller than that in the example shown in FIG. 19B. This is because the second propagation member 12 is detached from the second end portion E2 by sliding the second propagation member 12 along a direction in which the opening OP extends.

As shown in FIG. 20A, the transport unit 33 transports the held second propagation member 12 to another place. As shown in FIG. 20B, the transport unit 33 transports another new second propagation member 12 onto the second end portion E2. The new second propagation member 12 is placed on the extrusion portion 32*b*. As shown in FIG. 20C, the extrusion unit 32 lowers the extrusion portion 32*b* and places the second propagation member 12 on the second end portion E2. As shown in FIG. 20D, the release unit 31 brings the bar 31*a* close to the first propagation member 11 to release the deformation of the plate member 13*a*. According to the above operation, the second propagation member 12 is replaced.

The processing device 90 controls operations of the release unit 31, the extrusion unit 32, and the transport unit 33. For example, when the second propagation member 12 is determined to be abnormal, the processing device 90 causes each unit to replace the second propagation member 12. Accordingly, a more appropriate detection result of the reflected waves can be obtained.

Figure 21:
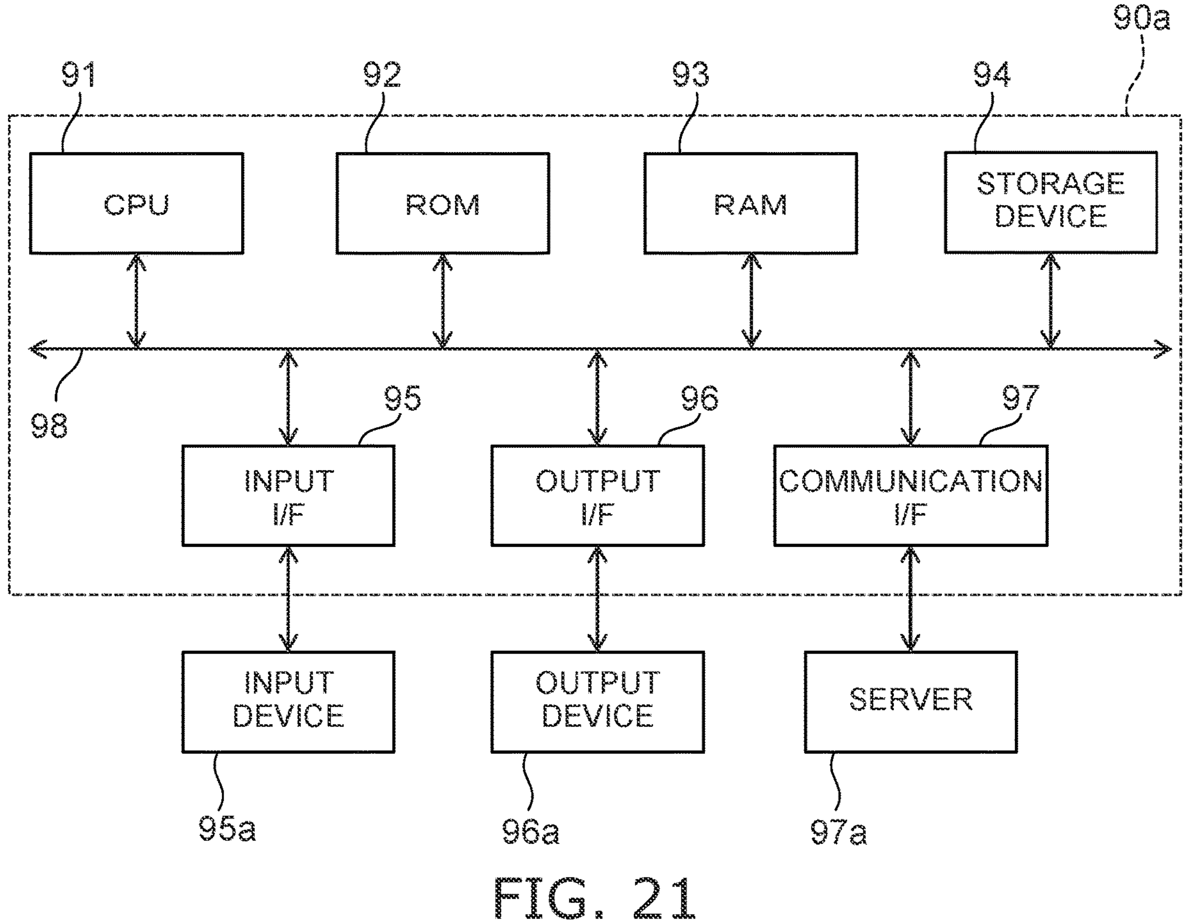
FIG. 21 is a schematic diagram showing a hardware configuration.

FIG. 21 is a schematic diagram showing a hardware configuration.

For example, a computer 90*a* shown in FIG. 21 may be used as the processing device 90. The computer 90*a* includes a CPU 91, a ROM 92, a RAM 93, a storage device 94, an input interface 95, an output interface 96, and a communication interface 97.

The ROM 92 stores a program for controlling an operation of the computer 90*a*. The ROM 92 stores a program necessary for the computer 90*a* to implement the above-described processes. The RAM 93 functions as a memory area onto which the program stored in the ROM 92 is loaded.

The CPU 91 includes a processing circuit. The CPU 91 executes a program stored in at least one of the ROM 92 and the storage device 94 using the RAM 93 as a work memory. During the execution of the program, the CPU 91 controls each component via a system bus 98 to execute various processes.

The storage device 94 stores data necessary for executing the program and data obtained by executing the program.

The input interface (I/F) 95 connects the processing device 90*a* to an input device 95*a*. The input I/F 95 is, for example, a serial bus interface such as a USB. The CPU 91 can read various types of data from the input device 95*a* via the input I/F 95.

The output interface (I/F) 96 connects the processing device 90*a* to an output device 96*a*. The output I/F 96 is, for example, a video output interface such as a digital visual interface (DVI) or a high-definition multimedia interface (HDMI (registered trademark)). The CPU 91 can transmit data to the output device 96*a* via the output I/F 96 and display an image on the output device 96*a*.

The communication interface (I/F) 97 connects a server 97*a* outside the processing device 90*a* to the processing device 90. The communication I/F 97 is, for example, a network card such as a LAN card. The CPU 91 can read various types of data from the server 97*a* via the communication I/F 97.

The storage device 94 includes one or more selected from a hard disk drive (HDD) and a solid state drive (SSD). The input device 95*a* includes one or more selected from a mouse, a keyboard, a microphone (voice input), and a touch pad. The output device 96*a* includes one or more selected from a monitor and a projector. A device having functions of both the input device 95*a* and the output device 96*a*, such as a touch panel, may be used.

Processes of the various types of data described above may be stored on a magnetic disk (a flexible disk, a hard disk, or the like), an optical disk (CD-ROM, CD-R, CD-RW, DVD-ROM, DVD±R, DVD±RW, or the like), a semiconductor memory, or another non-transitory computer-readable storage medium as a program that can be executed by a computer.

For example, information recorded in the storage medium can be read by the computer (or an embedded system). In the storage medium, a recording format (storage format) is set as desired. For example, the computer reads the program from the storage medium and causes the CPU to execute instructions described in the program based on the program. In the computer, acquisition (or reading) of the program may be performed through a network.

According to the detection device 10, the detection system 1*a*, or the detection system 1*b* described above, it is possible to eliminate the need for the couplant liquid and to easily replace the second propagation member 12. By using the second propagation member 12 or the fixture 13 according to the embodiment, the couplant liquid is not required. The second propagation member 12 according to the embodiment can be easily replaced. By using a program for causing the computer to replace the second propagation member 12, a more appropriate detection result can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A detection device comprising:

a detector including a plurality of detection elements configured to transmit an ultrasonic wave toward an object and detect a reflected wave;

a first propagation member attached to the detector and configured to propagate the ultrasonic wave;

a second propagation member configured to propagate the ultrasonic wave and being softer than the first propagation member; and a fixture configured to detachably fix the second propagation member to the first propagation member, wherein a portion of the second propagation member protrudes beyond the fixture toward a first direction from the first propagation member toward the second propagation member, the fixture includes a first contact surface configured to contact the object, the first propagation member includes a second contact surface configured to contact the second propagation member when the second propagation member is fixed by the fixture, and when the portion of the second propagation member contacts the object, the portion of the second propagation member deforms along a surface shape of the object such that a thickness of the portion in the first direction is reduced, thereby causing the first contact surface to contact a surface of the object in a state in which the first contact surface is substantially parallel to the second contact surface.

2. The device according to claim 1, wherein the second propagation member includes a first portion configured to be pressed against the fixture, and a second portion surrounded by the first portion, the second portion protruding from the first portion and being configured to come into contact with the object, the second portion is the portion of the second propagation member that protrudes beyond the fixture toward the first direction.

3. The device according to claim 1, wherein the detector includes a housing that houses the plurality of detection elements, and the fixture includes a pressing member having one end fixed to the housing and the other end pressing the second propagation member toward the first propagation member.

4. The device according to claim 1, wherein the second propagation member has an acoustic impedance larger than $1.0\times10^5$ (Pa·s/m) and smaller than $1.0\times10^8$ (Pa·s/m).

5. A detection system comprising:

the detection device according to claim 1; and a processing device configured to determine whether the second propagation member is abnormal based on intensity data indicating an intensity of the reflected wave detected by the plurality of detection elements.

6. The system according to claim 5, further comprising:

a replacement device configured to remove the second propagation member from the fixture and supply another second propagation member.

7. The system according to claim 5, further comprising:

a release unit configured to release the fixation of the second propagation member by the fixture;

an extrusion unit configured to extrude the second propagation member placed on the fixture; and a transport unit configured to transport the second propagation member.

8. A detection system comprising:

the detection device according to claim 1; and a robot including a manipulator, the detection device being provided at a distal end of the manipulator.

9. A detection system comprising:

a detection device including a detector including a plurality of detection elements configured to transmit an ultrasonic wave toward an object and detect a reflected wave, a first propagation member attached to the detector and configured to propagate the ultrasonic wave, a second propagation member attached to the first propagation member, the second propagation member being configured to propagate the ultrasonic wave and being softer than the first propagation member, a fixture configured to detachably fix the second propagation member to the first propagation member; and a replacement device configured to replace the second propagation member, wherein a portion of the second propagation member protrudes beyond the fixture toward a first direction from the first propagation member toward the second propagation member, the fixture includes a first contact surface configured to contact the object, the first propagation member includes a second contact surface configured to contact the second propagation member when the second propagation member is fixed by the fixture, and when the portion of the second propagation member contacts the object, the portion of the second propagation member deforms along a surface shape of the object such that a thickness of the portion in the first direction is reduced, thereby causing the first contact surface to contact a surface of the object in a state in which the first contact surface is substantially parallel to the second contact surface.

10. The system according to claim 9, further comprising a processing device configured to determine whether the second propagation member is abnormal based on intensity data, the intensity data indicating an intensity of the reflected waves detected by the plurality of detection elements.

11. The system according to claim 9, wherein the detector includes a housing that houses the plurality of detection elements, and the fixture includes a pressing member having one end detachably fixed to the housing and the other end pressing the second propagation member toward the first propagation member.

12. The system according to claim 11, further comprising:

a release unit configured to release the fixation of the second propagation member by the fixture;

an extrusion unit configured to extrude the second propagation member placed on the fixture; and a transport unit configured to transport the second propagation member.

13. A detection device comprising:

a detector including a plurality of detection elements configured to transmit an ultrasonic wave toward an object and detect a reflected wave;

a first propagation member attached to the detector and configured to propagate the ultrasonic wave;

a second propagation member configured to propagate the ultrasonic wave and being softer than the first propagation member, the second propagation member having a hardness measured by an ASKER Durometer Type F that is greater than 40 and less than 60; and a fixture configured to detachably fix the second propagation member to the first propagation member, wherein a portion of the second propagation member protrudes beyond the fixture toward a first direction from the first propagation member toward the second propagation member, the fixture includes a first contact surface configured to contact the object, and when the portion of the second propagation member contacts the object, the portion of the second propagation member deforms along a surface shape of the object such that a thickness of the portion in the first direction is reduced, thereby causing the first contact surface to contact a surface of the object.

14. The detection device according to claim 13, wherein the first propagation member includes a second contact surface configured to contact the second propagation member when the second propagation member is fixed by the fixture, and the first contact surface contacts the surface of the object in a state in which the first contact surface is substantially parallel to the second contact surface.

15. The detection device according to claim 13, wherein the second propagation member includes:

a first portion configured to be pressed against the fixture; and a second portion surrounded by the first portion, the second portion protruding from the first portion and being configured to come into contact with the object.

16. The detection device according to claim 15, wherein when the second portion comes into contact with the object, the second portion is deformed such that the fixture comes into contact with the object via the first contact surface.

17. The detection device according to claim 13, wherein the detector includes a housing that houses the plurality of detection elements, and the fixture includes a pressing member having one end fixed to the housing and the other end pressing the second propagation member toward the first propagation member.

18. The detection device according to claim 13, wherein the second propagation member has an acoustic impedance larger than $1.0\times10^5$ (Pa·s/m) and smaller than $1.0\times10^8$ (Pa·s/m).

19. A detection system comprising:

a detection device including a detector including a plurality of detection elements configured to transmit an ultrasonic wave and detect a reflected wave, a first propagation member attached to the detector and configured to propagate the ultrasonic wave, and a fixture configured to detachably fix a second propagation member to the first propagation member, the second propagation member being configured to propagate the ultrasonic wave and being softer than the first propagation member;

a processing device configured to determine whether the second propagation member is abnormal based on intensity data indicating an intensity of the reflected wave detected by the plurality of detection elements;

a release unit configured to release the fixation of the second propagation member by the fixture;

an extrusion unit configured to extrude the second propagation member placed on the fixture; and a transport unit configured to transport the second propagation member.

* * * * *